Feb. 13, 1968 R. BAKIS 3,369,076

FORMANT LOCATING SYSTEM

Filed May 18, 1964 7 Sheets-Sheet 1

INVENTOR
RAIMO BAKIS

BY John J. Goodwin
ATTORNEY

Feb. 13, 1968 R. BAKIS 3,369,076

FORMANT LOCATING SYSTEM

Filed May 18, 1964 7 Sheets-Sheet 3

| FIG. 5A | FIG. 5B | FIG. 5C | FIG. 5D |
|---|---|---|---|

United States Patent Office 3,369,076

Patented Feb. 13, 1968

3,369,076

FORMANT LOCATING SYSTEM

Raimo Bakis, Ossining, N.Y., assignor to International Business Machines Corporation, New York, N.Y., a corporation of New York Filed May 18, 1964, Ser. No. 367,935
10 Claims. (Cl. 179—1)

ABSTRACT OF THE DISCLOSURE

The power spectrum of the input speech signal is established and the slope of the logarithm of the power spectrum is determined. The weighted average of the slope of the logarithm of the power spectrum is obtained and the formant locations are determined from the steps therein.

The present invention relates to a system for analyzing speech signals and more particularly to a system for identifying formant frequencies.

It is accepted that an important technique in speech recognition is the identification of formant frequencies. The relative location of at least the first three formant frequencies within the frequency spectrum of a voiced sound signal may be utilized to identify the sound.

In some known methods of formant identification the speech signal is applied to a plurality of narrow-band filters and the power of the filter output signals are measured, the output signals having higher power values than the output signals adjacent thereto determine the positions of the formants. A disadvantage of this method is that when two or more formants are positioned closely together they cannot be distinguished.

Another known method of formant identification is by synthesis and comparison. An initial guess is made as to the formant frequencies. A spectrum having formants at such frequencies is synthesized and compared with the actual speech spectrum. This is repeated until a satisfactory match is produced. This method is inefficient and time consuming because of the large number of trial and error calculations required.

The present invention relates to a new and improved system for determining the positions of formant frequencies within the frequency spectrum of a speech signal.

Speech signals, particularly voiced sounds, are formed by bursts of air from the glottis passing through the vocal cavity. The vocal cavity may be thought of as a resonant circuit. The effect of the vocal cavity on the speech signal is similar to a number of resonant circuits in that the power of the output speech signal will be maximum at the frequencies at which the vocal cavity is resonant. Referring to FIG. 1, a curve is shown which represents the logarithm of the power spectrum with respect to the logarithm of frequency for a hypothetical speech signal having one formant. The peak shown in the curve of FIG. 1 is the result of a formant, that is, a maximum point in the power spectrum of a speech signal. It is known that the location of the first, second and third formants within a speech signal may be employed to define the sound. Within limits, the first three formants in voiced sounds will repeatedly appear at the same relative locations.

As previously stated, there are present systems for locating the positions of formants which analyze the power spectrum of the speech signals for the maximums. This approach fails when two or more formants are located so close together that they appear as a single peak.

The present invention is based on a different and novel approach. The present invention employs two basic functional means. A first means responsive to a speech signal for performing measurements thereon, said measurements being linear functions of the contributions of the formants present in the speech signal. By linear functions of the contributions of the formants it is meant that if there are a set of formants present in a speech signal, and if one of them is shifted in frequency, then the measured value changes a given amount, the given amount being independent of the location of the other formants. A second means is connected to the first means for linearly combining the measurements thereof according to a weighted average. The linearly combined signal is then representative of the locations of the formants in the speech signal. An indicator means may be provided which is responsive to the linearly combined signal for displaying the frequencies at which the formants are located.

In the present embodiment the aforesaid measurements will be the slopes of the curve of the logarithm of the power spectrum of the speech signal vs. the logarithm of the frequency.

The present novel embodiment is based on the approach that the slope of the power spectrum after the peak value is representative of the formant location. This approach is based on the premise that the contribution of individual formants to the logarithm of the power spectrum are additive and that for frequencies sufficiently far below a given formant, the contribution of that formant to the slope of the power spectrum is zero. Also, for frequencies sufficiently far above a given formant, the contribution is constant at a value of approximately —12 decibels per octave.

The aforesaid can be shown by plotting the relationship of the slope of the power spectrum curve of FIG. 1 with respect to frequency. In FIG. 2, a curve is shown which is the slope vs. frequency relationship of the power spectrum curve of FIG. 1. It can be seen that the location of the formant is manifested by a large peak to peak amplitude value; that frequencies far below the formant frequency contribute zero to the curve; and that frequencies far above the formant frequency contribute a constant value to the curve.

The significant aspect of the curve of FIG. 2 is that the presence of a formant causes a change in the amplitude of the curve and then, if the peaks in the region of the formant location are ignored, the curve resembles a step function. It follows that if more than one formant were shown in the power spectrum curve of FIG. 1, then the curve of FIG. 2 would contain a separate step for each formant. As will be seen, the system of the present invention establishes a relation as shown in FIG. 2 and measures the number and amplitude of the steps of the function to determine the formants. As can be seen however, the amplitude of the curve in the region of the peaks can be much greater than the amplitude of the step. Since measurement of the amplitude of the curve in the region of the peaks would produce incorrect results, it is necessary to eliminate the peaks. A conventional method of smoothing or eliminating the peaks in the function is to take a weighted average of the function, that is, to take the convolution of the curve of FIG. 2 with a suitable weighting function. It has been mathematically determined by Fourier analysis that a weighting function which eliminates the peaks in the curve of FIG. 2 is represented by the function shown in FIG. 3. The convolution of the weighting function shown in FIG. 3 with the slope of the power spectrum function of FIG. 2 is shown by the curve of FIG. 4. As can be seen, the peaks have been removed. The step function shown in FIG. 4 provides an indication of the location of the formant, that being the point at which the step occurs. The magnitude of the step also indicates the number of formants at the location. If, for example, two formants happened to be located so close together such as to be indistinguishable by peak detection or other conventional formant locating methods, in the present system the magnitude of the step would be double, thereby indicating the presence of two formants at approximately the same location.

The approach to locating formants in the present invention can be summarized as follows. Establish the power spectrum of the input speech signal and determine the slope of the logarithm of the power spectrum. Obtain the weighted average of the slope of the logarithm of the power spectrum and determine the formant locations from the steps therein. As will be seen, the above approach can be carried out by a practical embodiment. In the embodiment the slope of the power spectrum is obtained by frequency separating the speech signal by narrow band filters, determining the power output of each filter and computing the logarithms of the powers. The logarithms of the powers are linearly combined according to a weighted average (convolution), the difference between the logarithms of the powers being representative of the slope of the power spectrum.

An object of the present invention is to provide a system for performing measurements on speech signals and producing output signals wherein formants are represented by step functions.

Another object of the present invention is to provide a speech responsive system for producing output signals having step functions representing formant frequencies and wherein the amplitudes of the step functions are proportional to the number of formants at given frequencies.

A further object of the present invention is to provide a speech responsive system wherein the locations of formants within a speech signal are determined by a signal which is a combination of linear functions of the slope of the logarithm of the power spectrum of the speech signal vs. the logarithm of the frequency.

Still another object of the present invention is to provide a speech responsive system which indicates the frequencies of at least the first three formants of the speech signal.

The foregoing and other objects, features and advantages of the invention will be apparent from the following more particular description of a preferred embodiment of the invention, as illustrated in the accompanying drawings.

FIGS. 5A, 5B, 5C and 5D combined represent a block diagram of a system for determining the positions of formant frequencies within the spectrum of a speech signal.

Figure 1:
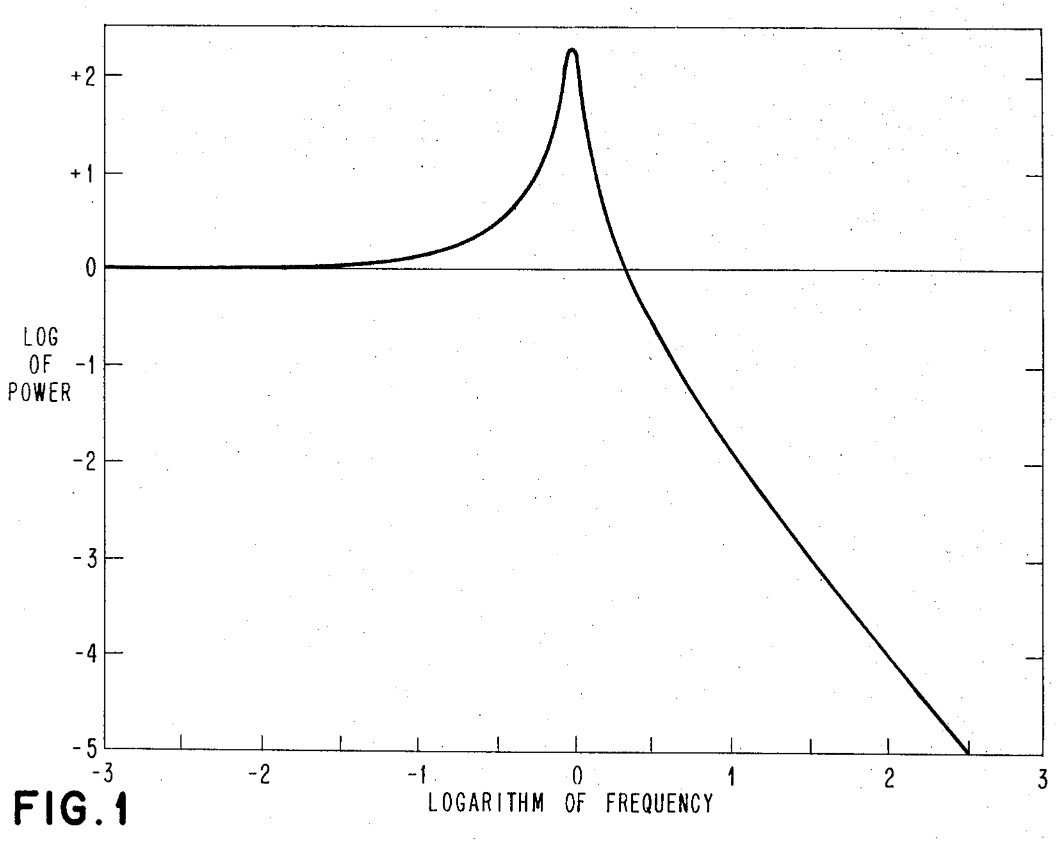
FIG. 1 is an illustration of the relationship between the logarithm of the power spectrum and the logarithm of the frequency of a hypothetical speech signal.
Figure 2:
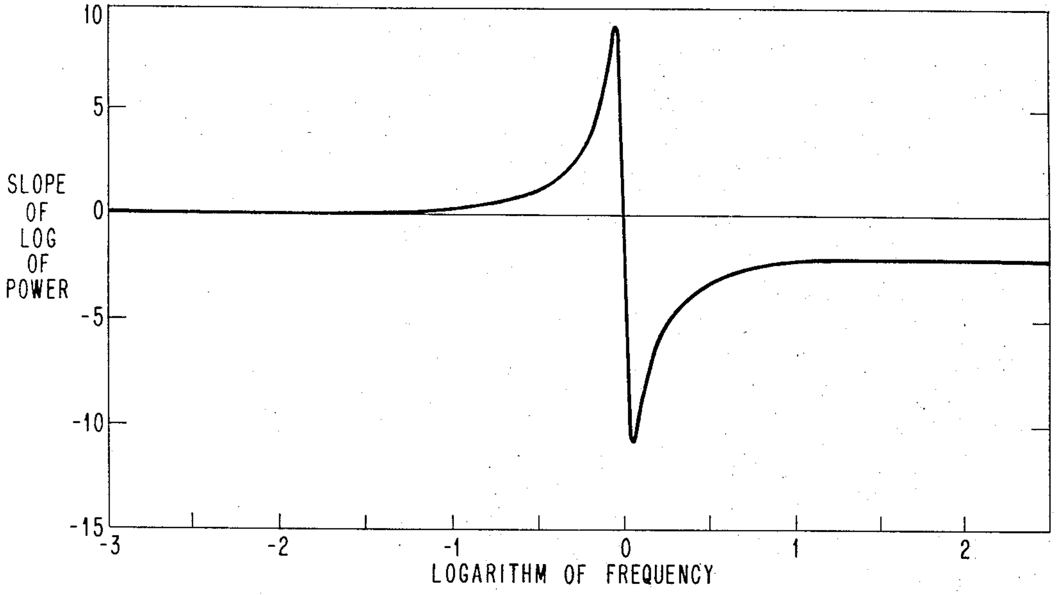
FIG. 2 is an illustration of a curve of the slope of the curve illustrated in FIG. 1.
Figure 3:
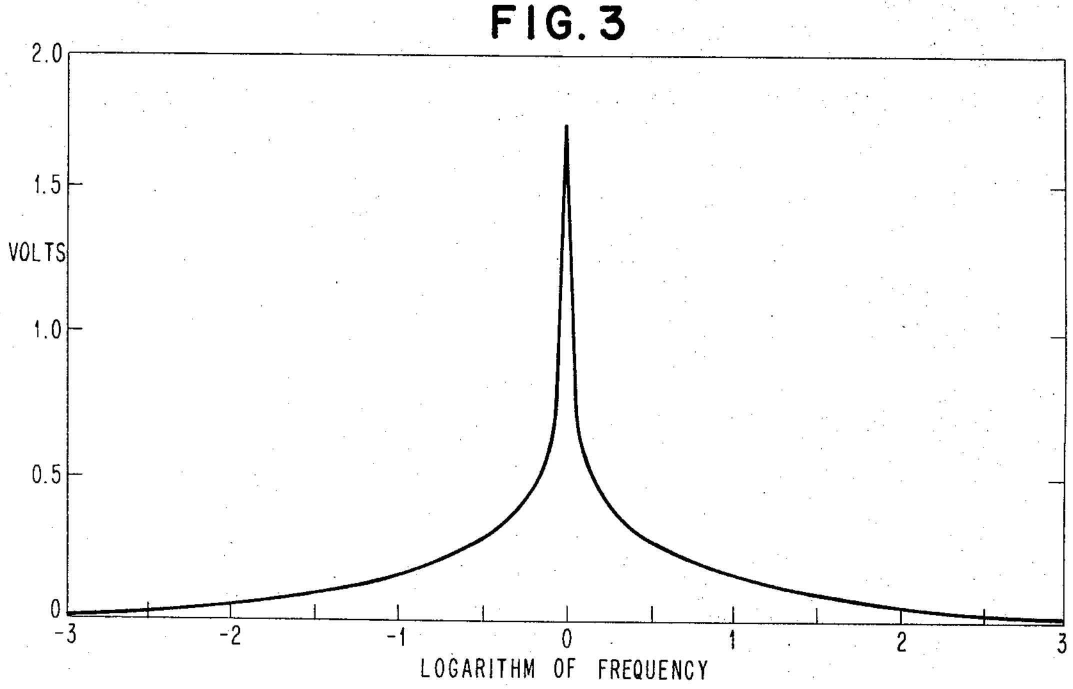
FIG. 3 is the curve of a weighting function applied to the curve of FIG. 2.
Figure 4:
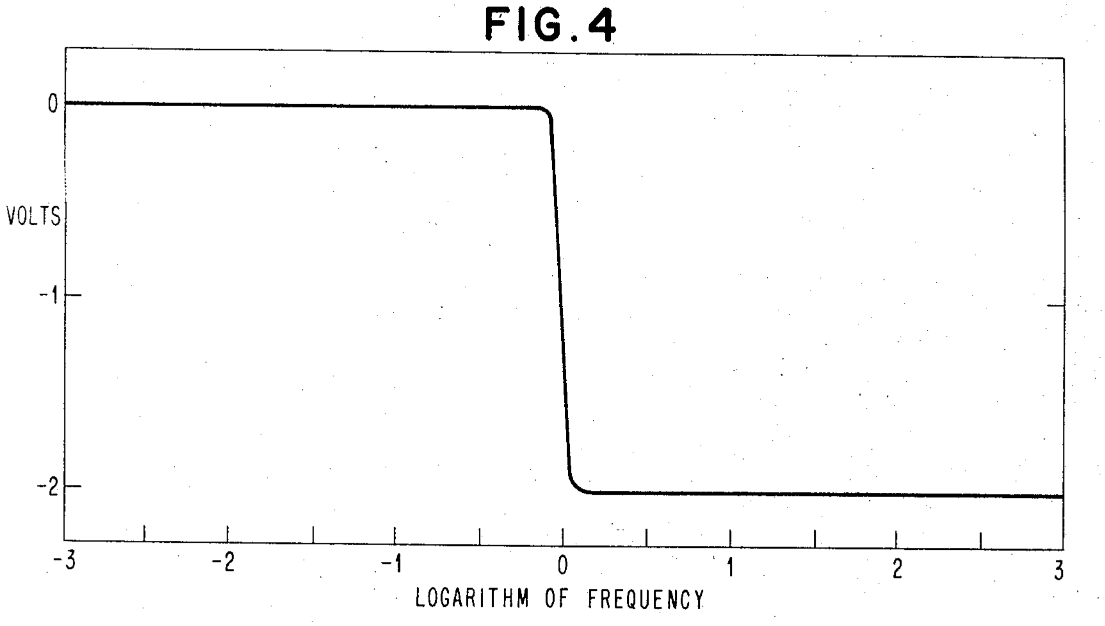
FIG. 4 is an illustration of a step function produced by applying the weighting function of FIG. 3 to the curve of FIG. 2.
Figures 5, 5A:
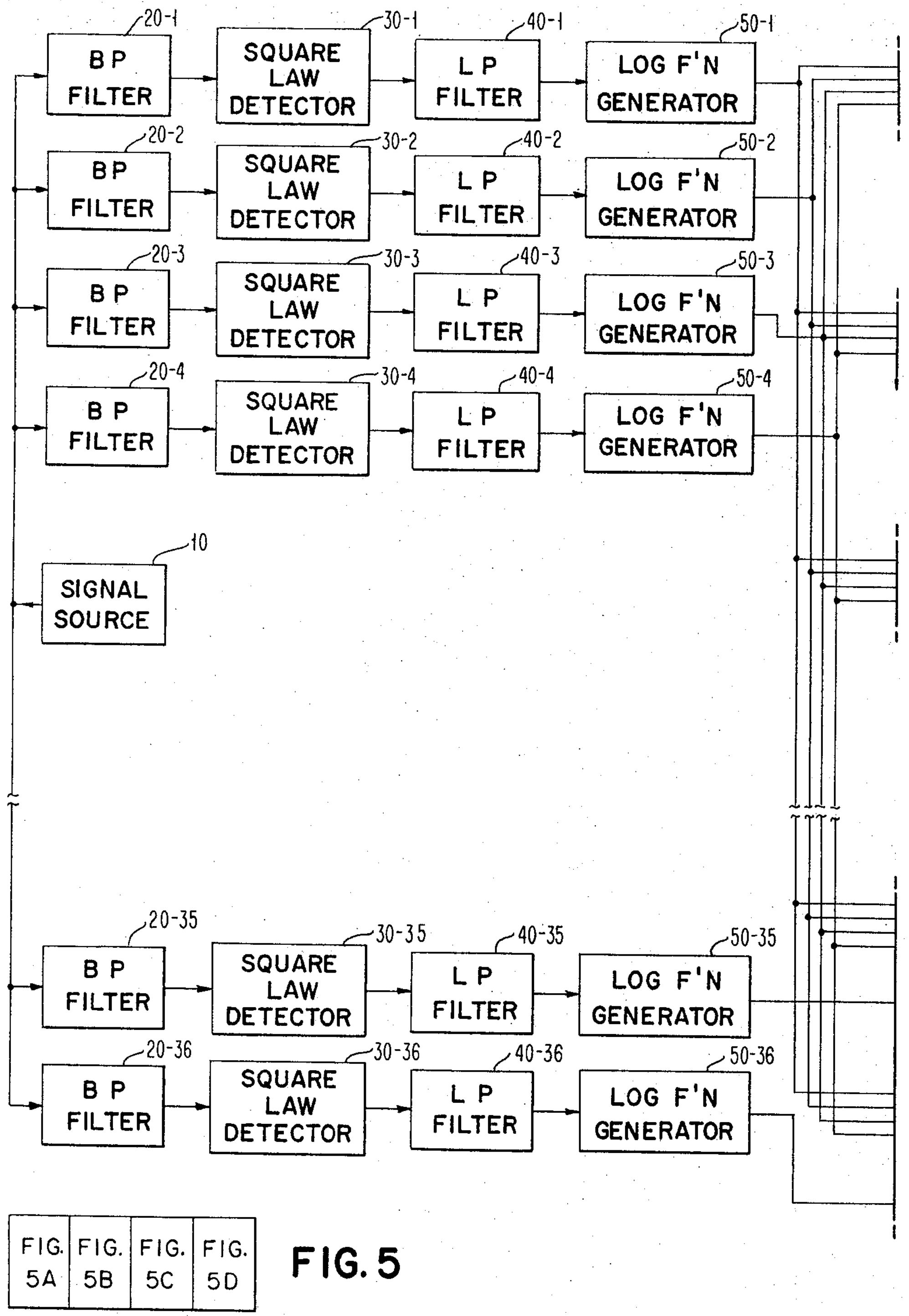
FIG. 5 illustrates how FIGS. 5A, 5B, 5C and 5D should be combined.
Figure 5B:
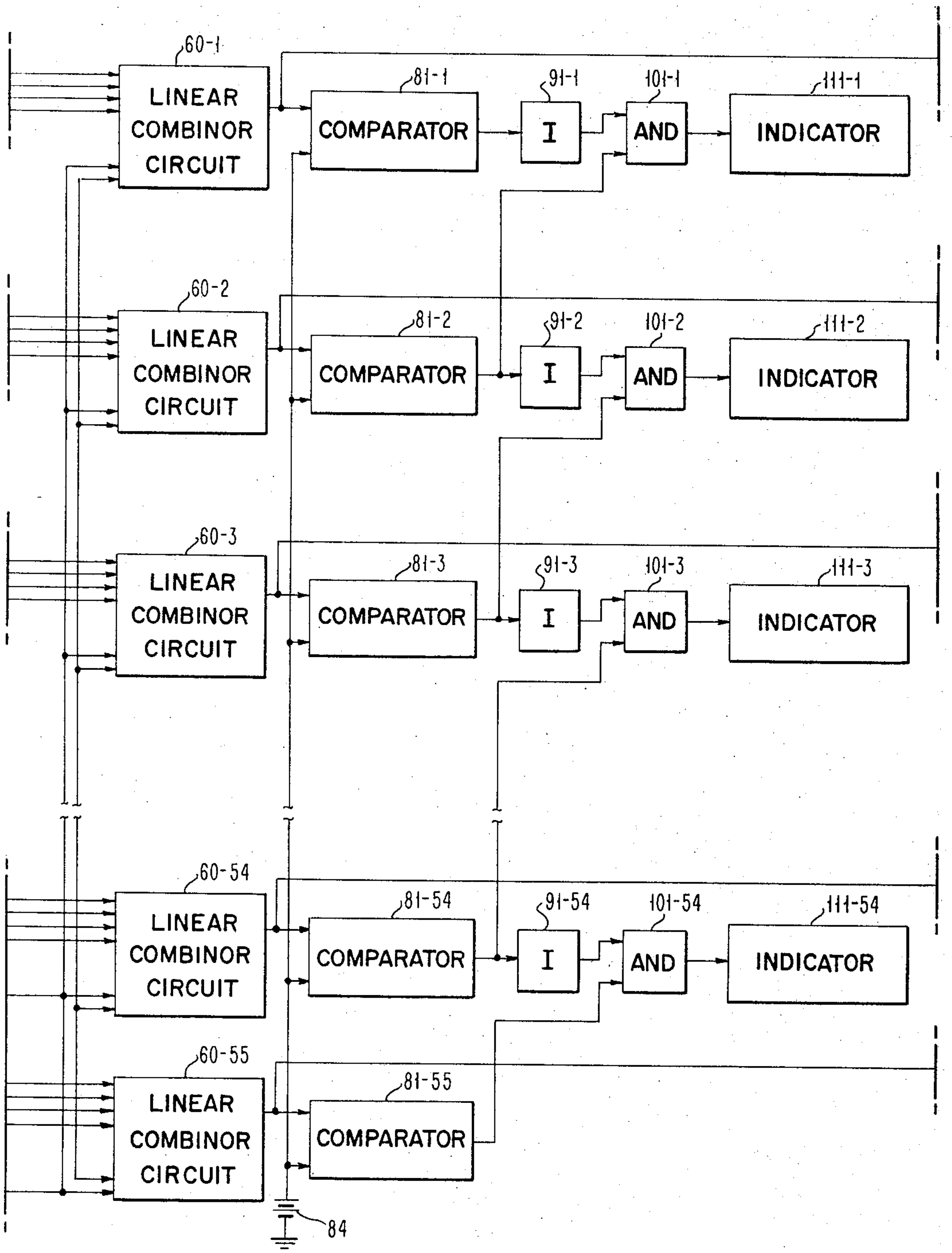
Figure 5C:
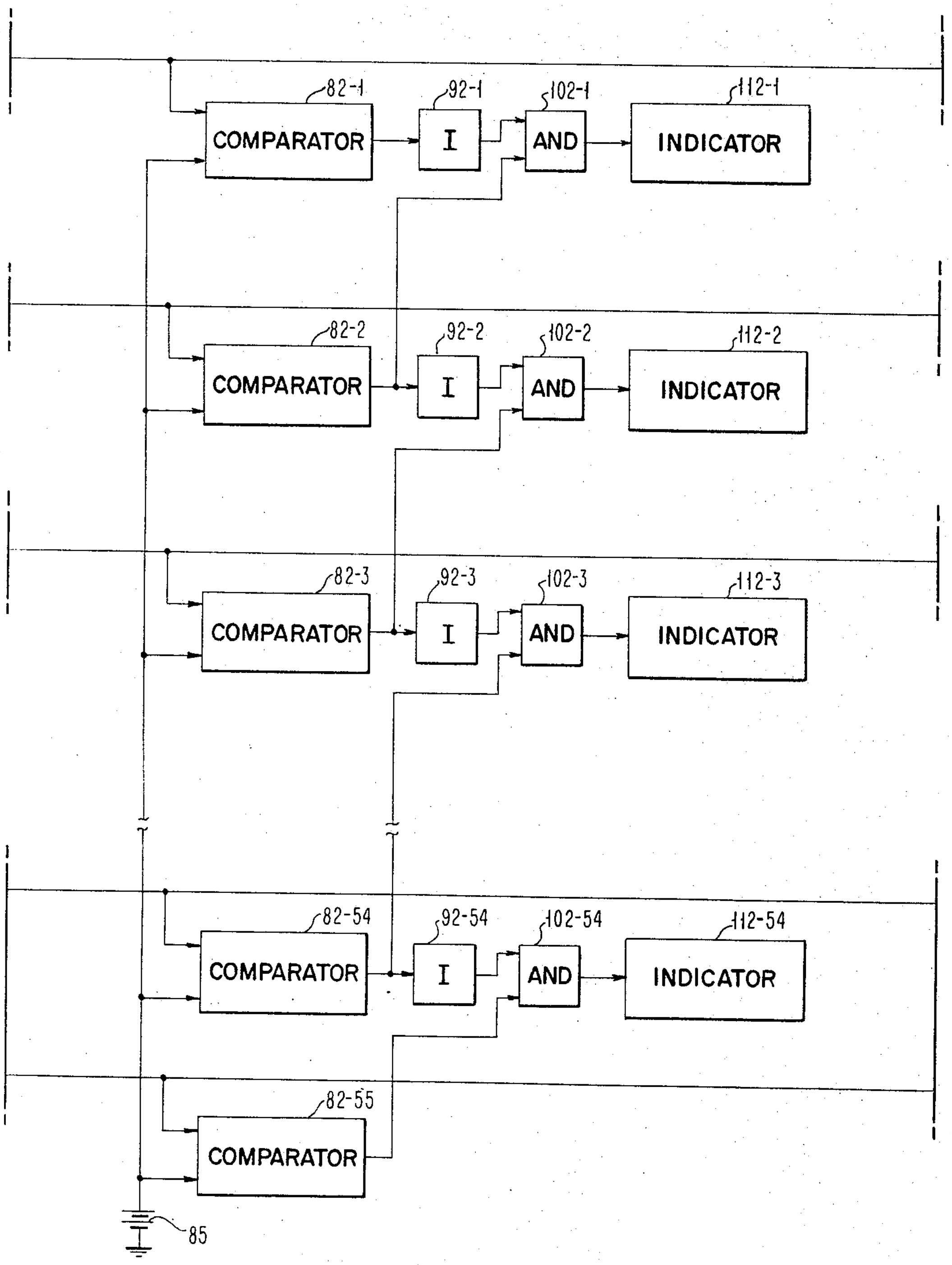
Figure 5D:
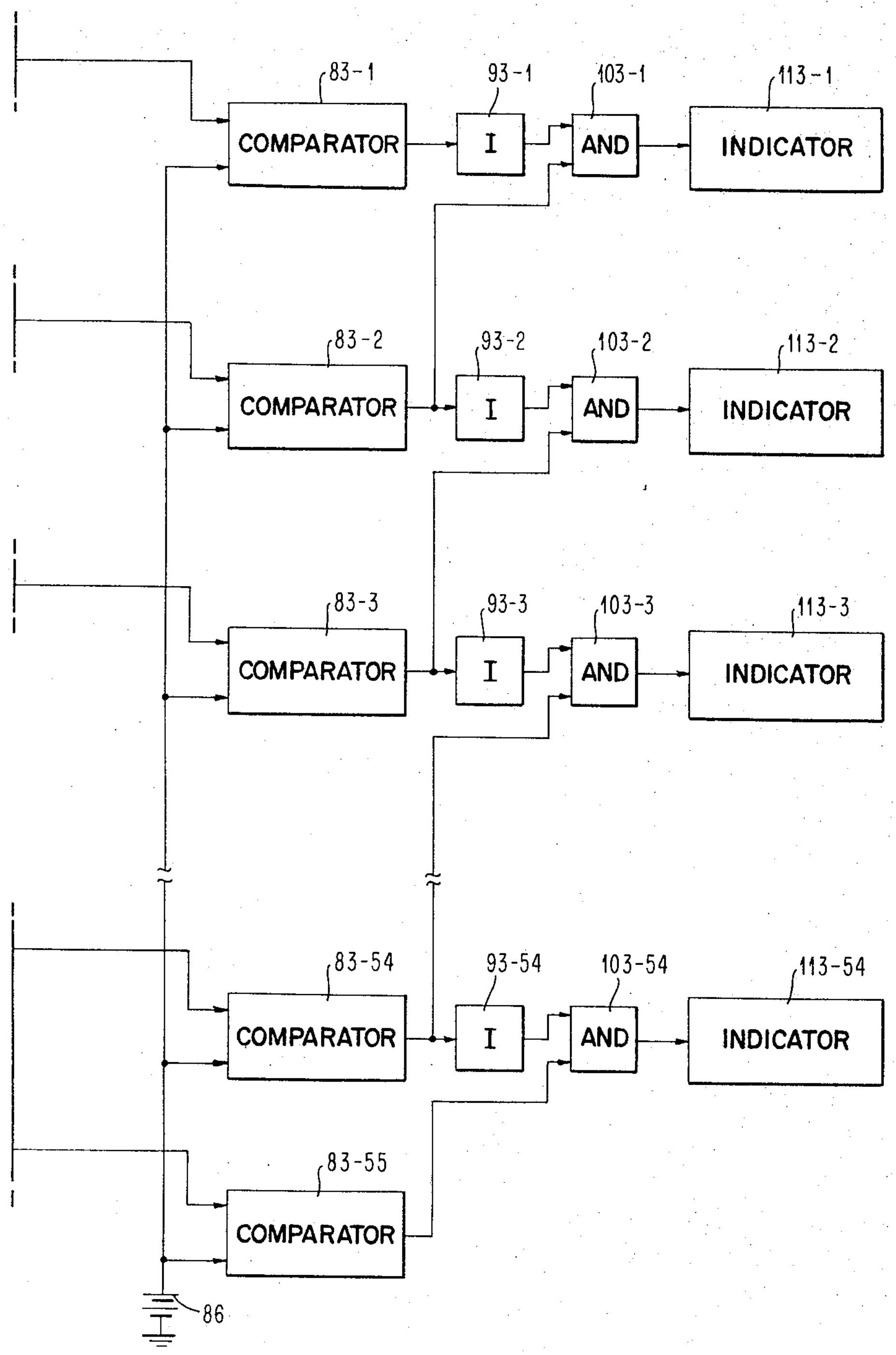
Figure 6:
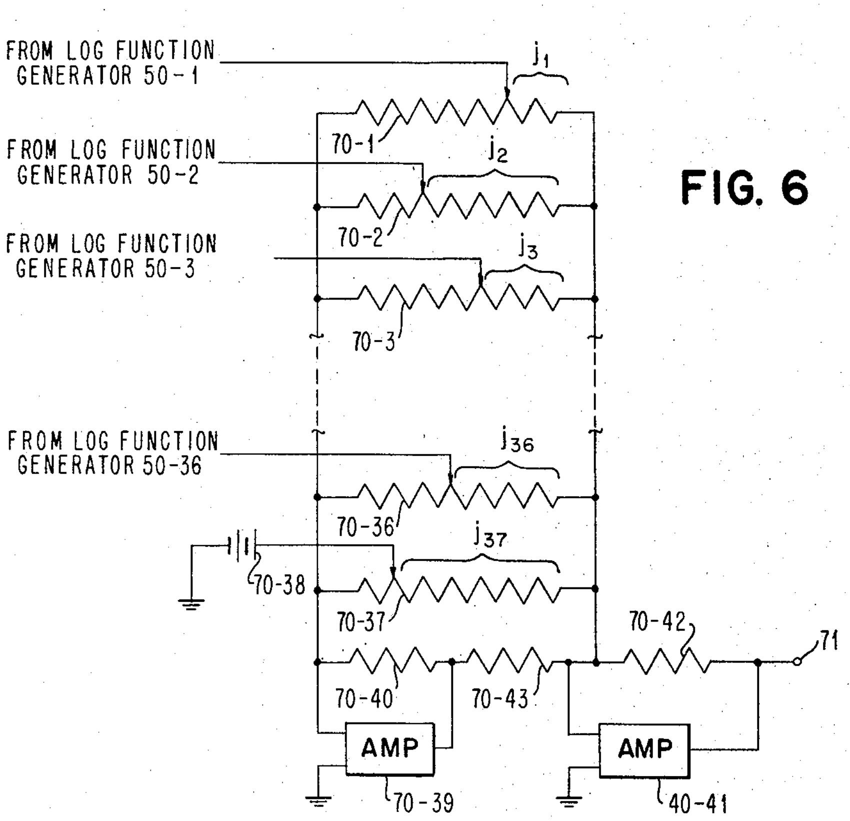

FIG. 6 is a detailed diagram of the linear combinor employed in the system of FIGS. 5A through 5D.

Figure 7:
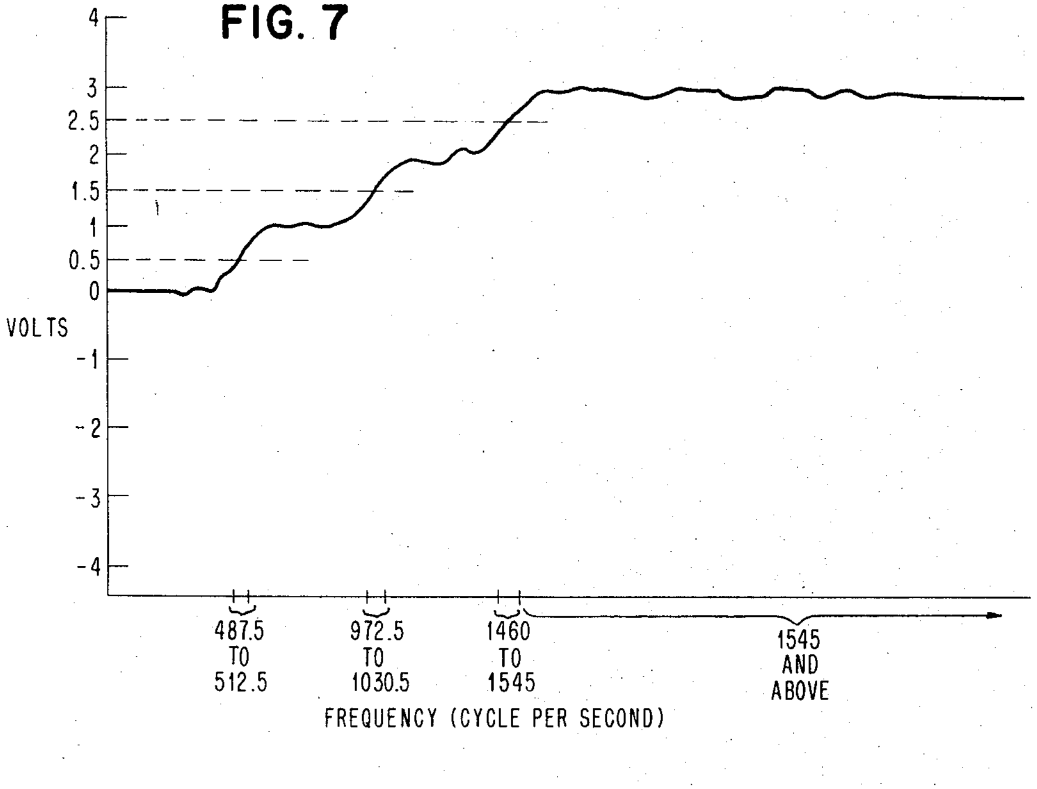

FIG. 7 is an illustration of step voltages obtained with the system of FIGS. 5A through 5D.

FIGS. 5A, 5B, 5C and 5D combined as shown in FIG. 5 show a block diagram of an embodiment of the present invention. A source of speech signals 10, for example, a microphone provides an output analog signal of a speech specimen. Signal source 10 is connected to a plurality of band pass filters which, in the present embodiment are thirty-six in number and are designated 20–1 through 20–36. Each of the filters 20–1 through 20–36 have separate center frequencies and bandwidth, and in the present example the values are as follows:

TABLE I

| Filter | Center frequency | Bandwidth |
|---|---|---|
| 20–1 | 100 | 50 |
| 20–2 | 150 | 100 |
| 20–3 | 200 | 200 |
| 20–4 | 250 | 200 |
| 20–5 | 300 | 200 |
| 20–6 | 350 | 200 |
| 20–7 | 400 | 200 |
| 20–8 | 450 | 200 |
| 20–9 | 500 | 200 |
| 20–10 | 550 | 200 |
| 20–11 | 600 | 200 |
| 20–12 | 668 | 200 |
| 20–13 | 750 | 200 |
| 20–14 | 842 | 200 |
| 20–15 | 945 | 200 |
| 20–16 | 1060 | 200 |
| 20–17 | 1180 | 200 |
| 20–18 | 1340 | 200 |
| 20–19 | 1500 | 200 |
| 20–20 | 1680 | 200 |
| 20–21 | 1890 | 218 |
| 20–22 | 2120 | 245 |
| 20–23 | 2360 | 273 |
| 20–24 | 2670 | 310 |
| 20–25 | 3000 | 347 |
| 20–26 | 3370 | 389 |
| 20–27 | 3780 | 436 |
| 20–28 | 4240 | 490 |
| 20–29 | 4720 | 546 |
| 20–30 | 5350 | 620 |
| 20–31 | 6000 | 694 |
| 20–32 | 6740 | 778 |
| 20–33 | 7560 | 872 |
| 20–34 | 8490 | 980 |
| 20–35 | 9450 | 1090 |
| 20–36 | 10,700 | 1240 |

The filters 20–1 through 20–36 will respectively pass the signals from source 10 within the designated frequency ranges. The outputs of the filters 20–1 through 20–36 are respectively connected to square law detector circuits 30–1 through 30–36. The square law detector circuits, as is well known, produce output signals which are representative of the power of the input signals.

The outputs of the square law detector circuits 30–1 through 30–36 are respectively connected through conventional low-pass filters 40–1 through 40–36 to logarithm function generator circuits 50–1 through 50–36 which provide output signals which are the logarithm function of the input signals thereto. The output signals from logarithm function generators 50–1 through 50–36 represent the log of the power of the input signal within the frequency range of their associated band-pass filters 20–1 through 20–36.

The outputs of each of logarithm function generators 50–1 through 50–36 are connected to a plurality (fifty-five) of linear combinor circuits 60–1 through 60–55. The linear combinor circuits accept the logs of the power signals and apply weighted averages to their differences. Each of the linear combinor circuits therefore has thirty-six inputs, one from each separate logarithm function generator. The details of linear combinor circuit 60–1 is shown in FIG. 6. In FIG. 6 each of the input leads from the logarithm function generators are connected to a point on parallel connected resistors 70–1 through 70–36. Each of the resistors 70–1 through 70–36 have a value R. A voltage source 70–38 of +1.0 volt is connected to an R valued resistor 70–37. The relative location of each input lead along the length of each of the resistors is predetermined. The location of the input lead on each resistor is designated by the distance the input lead is from the extreme right end of the resistor, and is referred to as $j$. Thus, the input lead from logarithm function generator 50–1 is at a position $j_1$ on resistor 70–1. The input lead from logarithm function generator 50–2 is a position $j_2$ on resistor 70–2 and so on. One side of the parallel combination of resistors 70–1 through 70–37 is connected as an input to an operational amplifier 70–39 having a feedback resistor 70–40 with a value $R_0$. The other side of the parallel combination of resistors 70–1 through 70–37 is connected as an input to another operational amplifier 70–41 having a feedback resistor 70–42 also with a value $R_0$. The output of amplifier 70–39 is connected to the input of amplifier 70–41 through a resistor 70–43 which also has a value $R_0$. The output from the linear combinor 60–1 is taken from the output of amplifier 70–41 on lead 71. The input voltages to resistors 70–1 through 70–36 from the logarithm function generators are designated in FIG. 5 as $e_1$ through $e_{36}$. The output voltage from the linear combinor circuit on lead 71 is set forth as follows:

$$e_{out}=\left(\frac{R_0}{R}\right)\left[\frac{2j_1-1}{j_1(1-j_1)}\right]\cdot e_1+\left(\frac{R_0}{R}\right)\left[\frac{2j_2-1}{j_2(1-j_2)}\right]\cdot e_2+\left(\frac{R_0}{R}\right)\left[\frac{2j_{37}-1}{j_{37}(1-j_{37})}\right]$$

or $$e_{out}=K+\sum_{x=1}^{x=36} y_x\cdot j_x$$

The output voltage from a linear combinor circuit is a constant K plus the sum of input voltages multiplied by a weighting factor $y$. The weighing factor $y$ is determined by the setting of the input lead on each of the resistors 70–1 through 70–36. That is, $$y_n=\left(\frac{R_0}{R}\right)\left(\frac{2j_n-1}{j_n(1-j_n)}\right)$$

The constant K is empirically determined and compensates for such factors as individual characteristics of the speakers voice and other known distortions such as microphone response characteristics.

As previously stated, the linear combinor circuits compare and weight the difference between the separate power logarithms. In a simple system there would be only thirty-five combinor circuits provided with two inputs each so as to respectively compare the outputs of generators 50–1 and 50–2, 50–2 and 50–3, 50–3 and 50–4, etc. In the present system shown in FIGS. 5A through 5D the outputs of generators 50–1 and 50–2 are compared in linear combinor 60–1, however the outputs of generators 50–3 through 50–36 are also taken into account, but weighted much less than the outputs of generators 50–1 and 50–2. The same is true of the remainder of the linear combinor circuit. Each primarily compares the outputs of a given two of the logarithm function generators weighted more heavily than the other thirty-four generators. Also, fifty-five rather than thirty-five linear combinor circuits are employed because it is possible, by judicious combining of the outputs of the nonadjacent logarithm function generators, intermediate points could be simulated as if more than thirty-six separate frequency bands were used.

To summarize, each of the linear combinor circuits receives the output signals from logarithm function generator circuits 50–1 through 50–36 and weights and combines them and adds a constant K to account for characteristics of the speaker's voice. Each of the thirty-six input signals to each linear combinor circuit is weighted by multiplying it with a factor established by a variable resistor setting. The thirty-six multiplied signals and the constant are combined into a single output signal from an operational amplifier. The multiplying factor has been designated $y$ and is equal to $$\left(\frac{R_0}{R}\right)\left(\frac{2j-1}{j(1-j)}\right)$$

where $j$ is the resistor setting in terms of distance from the end of the resistor. In Table I a set of workable frequency ranges were provided with relation to filters 20–1 through 20–36. In the interests of a complete specification the single value of K and the thirty-six values of $y$ for each of the fifty-five linear combinor circuits are set forth in Table II.

TABLE II

| Logarithm generator | y | K |
|---|---|---|
| **Combinor 60–1** | | |
| **50–1** | 0.15585 | –0.97984 |
| **50–2** | 0.02283 | |
| **50–3** | 0.57118 | |
| **50–4** | –0.49840 | |
| **50–5** | –0.16036 | |
| **50–6** | –0.01090 | |
| **50–7** | 0.02620 | |
| **50–8** | 0.00231 | |
| **50–9** | –0.01813 | |
| **50–10** | –0.02003 | |
| **50–11** | 0.01917 | |
| **50–12** | –0.03546 | |
| **50–13** | 0.00740 | |
| **50–14** | –0.00718 | |
| **50–15** | 0.00355 | |
| **50–16** | –0.02325 | |
| **50–17** | 0.01018 | |
| **50–18** | –0.00841 | |
| **50–19** | –0.00095 | |
| **50–20** | –0.00616 | |
| **50–21** | 0.00093 | |
| **50–22** | –0.00513 | |
| **50–23** | 0.00174 | |
| **50–24** | –0.00469 | |
| **50–25** | –0.00019 | |
| **50–26** | –0.00285 | |
| **50–27** | –0.00007 | |
| **50–28** | –0.00236 | |
| **50–29** | –0.00023 | |
| **50–30** | –0.00192 | |
| **50–31** | 0.00012 | |
| **50–32** | –0.00250 | |
| **50–33** | 0.00245 | |
| **50–34** | –0.00680 | |
| **50–35** | 0.01136 | |
| **50–36** | –0.01930 | |
| **Combinor 60–2** | | |
| **50–1** | 0.14798 | –0.90900 |
| **50–2** | 0.03037 | |
| **50–3** | 0.58267 | |
| **50–4** | –0.50504 | |
| **50–5** | –0.16556 | |
| **50–6** | –0.01152 | |
| **50–7** | 0.02709 | |
| **50–8** | 0.00291 | |
| **50–9** | –0.01806 | |
| **50–10** | –0.02015 | |
| **50–11** | 0.01859 | |
| **50–12** | –0.03445 | |
| **50–13** | 0.00645 | |
| **50–14** | –0.00681 | |
| **50–15** | 0.00347 | |
| **50–16** | –0.02324 | |
| **50–17** | 0.01013 | |
| **50–18** | –0.00835 | |
| **50–19** | –0.00105 | |
| **50–20** | –0.00606 | |
| **50–21** | 0.00085 | |
| **50–22** | –0.00505 | |

TABLE II—Continued

| Logarithm generator | y | K |
|---|---|---|
| 50–23 | 0.00166 | |
| 50–24 | —0.00464 | |
| 50–25 | —0.00022 | |
| 50–26 | —0.00282 | |
| 50–27 | —0.00010 | |
| 50–28 | —0.00232 | |
| 50–29 | —0.00026 | |
| 50–30 | —0.00190 | |
| 50–31 | 0.00010 | |
| 50–32 | —0.00248 | |
| 50–33 | 0.00243 | |
| 50–34 | —0.00674 | |
| 50–35 | 0.01125 | |
| 50–36 | —0.01914 | |
| | Combinor 60–3 | |
| 50–1 | 0.13044 | —0.83772 |
| 50–2 | 0.04814 | |
| 50–3 | 0.59880 | |
| 50–4 | —0.50735 | |
| 50–5 | —0.17865 | |
| 50–6 | —0.01440 | |
| 50–7 | 0.02834 | |
| 50–8 | 0.00422 | |
| 50–9 | —0.01779 | |
| 50–10 | —0.02041 | |
| 50–11 | 0.01764 | |
| 50–12 | —0.03295 | |
| 50–13 | 0.00489 | |
| 50–14 | —0.00624 | |
| 50–15 | 0.00335 | |
| 50–16 | —0.02334 | |
| 50–17 | 0.01009 | |
| 50–18 | —0.00828 | |
| 50–19 | —0.00122 | |
| 50–20 | —0.00593 | |
| 50–21 | 0.00072 | |
| 50–22 | —0.00495 | |
| 50–23 | 0.00154 | |
| 50–24 | —0.00457 | |
| 50–25 | —0.00027 | |
| 50–26 | —0.00278 | |
| 50–27 | —0.00015 | |
| 50–28 | —0.00227 | |
| 50–29 | —0.00030 | |
| 50–30 | —0.00186 | |
| 50–31 | 0.00007 | |
| 50–32 | —0.00245 | |
| 50–33 | 0.00239 | |
| 50–34 | —0.00667 | |
| 50–35 | 0.01113 | |
| 50–36 | —0.01895 | |
| | Combinor 60–4 | |
| 50–1 | 0.10563 | —0.76506 |
| 50–2 | 0.07395 | |
| 50–3 | 0.59444 | |
| 50–4 | —0.46533 | |
| 50–5 | —0.20666 | |
| 50–6 | —0.02571 | |
| 50–7 | 0.02769 | |
| 50–8 | 0.00667 | |
| 50–9 | —0.01665 | |
| 50–10 | —0.02073 | |
| 50–11 | 0.01648 | |
| 50–12 | —0.03161 | |
| 50–13 | 0.00300 | |

TABLE II—Continued

| Logarithm generator | y | K |
|---|---|---|
| 50–14 | —0.00557 | |
| 50–15 | 0.00324 | |
| 50–16 | —0.02372 | |
| 50–17 | 0.01015 | |
| 50–18 | —0.00829 | |
| 50–19 | —0.00145 | |
| 50–20 | —0.00582 | |
| 50–21 | 0.00058 | |
| 50–22 | —0.00488 | |
| 50–23 | 0.00140 | |
| 50–24 | —0.00453 | |
| 50–25 | —0.00033 | |
| 50–26 | —0.00276 | |
| 50–27 | —0.00022 | |
| 50–28 | —0.00224 | |
| 50–29 | —0.00035 | |
| 50–30 | —0.00184 | |
| 50–31 | 0.00003 | |
| 50–32 | —0.00244 | |
| 50–33 | 0.00237 | |
| 50–34 | —0.00666 | |
| 50–35 | 0.01110 | |
| 50–36 | —0.01891 | |
| | Combinor 60–5 | |
| 50–1 | 0.08200 | —0.69680 |
| 50–2 | 0.09352 | |
| 50–3 | 0.54868 | |
| 50–4 | —0.34472 | |
| 50–5 | —0.24516 | |
| 50–6 | —0.05396 | |
| 50–7 | 0.02117 | |
| 50–8 | 0.01015 | |
| 50–9 | —0.01378 | |
| 50–10 | —0.02076 | |
| 50–11 | 0.01534 | |
| 50–12 | —0.03121 | |
| 50–13 | 0.00118 | |
| 50–14 | —0.00496 | |
| 50–15 | 0.00317 | |
| 50–16 | —0.02454 | |
| 57–17 | 0.01039 | |
| 50–18 | —0.00845 | |
| 50–19 | —0.00171 | |
| 50–20 | —0.00582 | |
| 50–21 | 0.00044 | |
| 50–22 | —0.00490 | |
| 50–23 | 0.00129 | |
| 50–24 | —0.00457 | |
| 50–25 | —0.00040 | |
| 50–26 | —0.00279 | |
| 59–27 | —0.00029 | |
| 50–28 | —0.00224 | |
| 50–29 | —0.00041 | |
| 50–30 | —0.00185 | |
| 50–31 | —0.00000 | |
| 50–32 | —0.00247 | |
| 50–33 | 0.00239 | |
| 50–34 | —0.00676 | |
| 50–35 | 0.01126 | |
| 50–36 | —0.01920 | |
| | Combinor 60–6 | |
| 50–1 | 0.06342 | —0.64304 |
| 50–2 | 0.09388 | |
| 50–3 | 0.49362 | |
| 50–4 | —0.20727 | |

TABLE II—Continued

| Logarithm generator | y | K |
|---|---|---|
| 50–5 | —0.24679 | |
| 50–6 | —0.10187 | |
| 50–7 | 0.00437 | |
| 50–8 | 0.01214 | |
| 50–9 | —0.00917 | |
| 50–10 | —0.01982 | |
| 50–11 | 0.01449 | |
| 50–12 | —0.03174 | |
| 50–13 | —0.00066 | |
| 50–14 | —0.00442 | |
| 50–15 | 0.00317 | |
| 50–16 | —0.02573 | |
| 50–17 | 0.01078 | |
| 50–18 | —0.00874 | |
| 50–19 | —0.00198 | |
| 50–20 | —0.00592 | |
| 50–21 | 0.00031 | |
| 50–22 | —0.00499 | |
| 50–23 | 0.00120 | |
| 50–24 | —0.00467 | |
| 50–25 | —0.00047 | |
| 50–26 | —0.00286 | |
| 50–27 | —0.00036 | |
| 50–28 | —0.00228 | |
| 50–29 | —0.00047 | |
| 50–30 | —0.00189 | |
| 50–31 | —0.00003 | |
| 50–32 | —0.00253 | |
| 50–33 | 0.00244 | |
| 50–34 | —0.00696 | |
| 50–35 | 0.01157 | |
| 50–36 | —0.01976 | |
| | Combinor **60–7** | |
| 50–1 | 0.04980 | —0.60095 |
| 50–2 | 0.07795 | |
| 50–3 | 0.45719 | |
| 50–4 | —0.13064 | |
| 50–5 | —0.16666 | |
| 50–6 | —0.15783 | |
| 50–7 | —0.02826 | |
| 50–8 | 0.00815 | |
| 50–9 | —0.00383 | |
| 50–10 | —0.01716 | |
| 50–11 | 0.01447 | |
| 50–12 | —0.03301 | |
| 50–13 | —0.00275 | |
| 50–14 | —0.00394 | |
| 50–15 | 0.00326 | |
| 50–16 | —0.02724 | |
| 50–17 | 0.01129 | |
| 50–18 | —0.00912 | |
| 50–19 | —0.00226 | |
| 50–20 | —0.00608 | |
| 50–21 | 0.00019 | |
| 50–22 | —0.00514 | |
| 50–23 | 0.00113 | |
| 50–24 | —0.00483 | |
| 50–25 | —0.00055 | |
| 50–26 | —0.00296 | |
| 50–27 | —0.00043 | |
| 50–28 | —0.00234 | |
| 50–29 | —0.00054 | |
| 50–30 | —0.00195 | |
| 50–31 | —0.00007 | |
| 50–32 | —0.00263 | |
| 50–33 | 0.00253 | |
| 50–34 | —0.00723 | |

TABLE II—Continued

| Logarithm generator | y | K |
|---|---|---|
| 50–35 | 0.01201 | |
| 50–36 | —0.02052 | |
| | Combinor **60–8** | |
| 50–1 | 0.04040 | —0.56579 |
| 50–2 | 0.05096 | |
| 50–3 | 0.43608 | |
| 50–4 | —0.09700 | |
| 50–5 | —0.06380 | |
| 50–6 | —0.17346 | |
| 50–7 | —0.07862 | |
| 50–8 | —0.00633 | |
| 50–9 | —0.00052 | |
| 50–10 | —0.01292 | |
| 50–11 | 0.01592 | |
| 50–12 | —0.03452 | |
| 50–13 | —0.00534 | |
| 50–14 | —0.00353 | |
| 50–15 | 0.00345 | |
| 50–16 | —0.02903 | |
| 50–17 | 0.01190 | |
| 50–18 | —0.00959 | |
| 50–19 | —0.00256 | |
| 50–20 | —0.00631 | |
| 50–21 | 0.00008 | |
| 50–22 | —0.00534 | |
| 50–23 | 0.00108 | |
| 50–24 | —0.00504 | |
| 50–25 | —0.00062 | |
| 50–26 | —0.00309 | |
| 50–27 | —0.00050 | |
| 50–28 | —0.00243 | |
| 50–29 | —0.00061 | |
| 50–30 | —0.00202 | |
| 50–31 | —0.00010 | |
| 50–32 | —0.00275 | |
| 50–33 | 0.00263 | |
| 50–34 | —0.00756 | |
| 50–35 | 0.01256 | |
| 50–36 | —0.02147 | |
| | Combinor **60–9** | |
| 50–1 | 0.03489 | —0.52455 |
| 50–2 | 0.02504 | |
| 50–3 | 0.40353 | |
| 50–4 | —0.05545 | |
| 50–5 | —0.01647 | |
| 50–6 | —0.10682 | |
| 50–7 | —0.13654 | |
| 50–8 | —0.03686 | |
| 50–9 | —0.00347 | |
| 50–10 | —0.00804 | |
| 50–11 | 0.01969 | |
| 50–12 | —0.03587 | |
| 50–13 | —0.00846 | |
| 50–14 | —0.00335 | |
| 50–15 | 0.00374 | |
| 50–16 | —0.03113 | |
| 50–17 | 0.01262 | |
| 50–18 | —0.01018 | |
| 50–19 | —0.00287 | |
| 50–20 | —0.00662 | |
| 50–21 | —0.00001 | |
| 50–22 | —0.00561 | |
| 50–23 | 0.00105 | |
| 50–24 | —0.00530 | |
| 50–25 | —0.00070 | |

TABLE II—Continued

| Logarithm generator | y | K |
|---|---|---|
| 50–26 | —0.00325 | |
| 50–27 | —0.00057 | |
| 50–28 | —0.00254 | |
| 50–29 | —0.00067 | |
| 50–30 | —0.00213 | |
| 50–31 | —0.00012 | |
| 50–32 | —0.00289 | |
| 50–33 | 0.00277 | |
| 50–34 | —0.00798 | |
| 50–35 | 0.01324 | |
| 50–36 | —0.02265 | |
| Combinor 60–10 | | |
| 50–1 | 0.03317 | —0.46747 |
| 50–2 | 0.00917 | |
| 50–3 | 0.33863 | |
| 50–4 | 0.01223 | |
| 50–5 | —0.00908 | |
| 50–6 | —0.01801 | |
| 50–7 | —0.15533 | |
| 50–8 | —0.08541 | |
| 50–9 | —0.01690 | |
| 50–10 | —0.00521 | |
| 50–11 | 0.02577 | |
| 50–12 | —0.03651 | |
| 50–13 | —0.01188 | |
| 50–14 | —0.00354 | |
| 50–15 | 0.00408 | |
| 50–16 | —0.03357 | |
| 50–17 | 0.01348 | |
| 50–18 | —0.01090 | |
| 50–19 | —0.00318 | |
| 50–20 | —0.00703 | |
| 50–21 | —0.00008 | |
| 50–22 | —0.00596 | |
| 50–23 | 0.00106 | |
| 50–24 | —0.00564 | |
| 50–25 | —0.00077 | |
| 50–26 | —0.00346 | |
| 50–27 | —0.00063 | |
| 50–28 | —0.00269 | |
| 50–29 | —0.00074 | |
| 50–30 | —0.00226 | |
| 50–31 | —0.00015 | |
| 50–32 | —0.00308 | |
| 50–33 | 0.00294 | |
| 50–34 | —0.00849 | |
| 50–35 | 0.01409 | |
| 50–36 | —0.02411 | |
| Combinor 60–11 | | |
| 50–1 | 0.03333 | —0.39839 |
| 50–2 | 0.00223 | |
| 50–3 | 0.26943 | |
| 50–4 | 0.05702 | |
| 50–5 | 0.01372 | |
| 50–6 | 0.01871 | |
| 50–7 | —0.09284 | |
| 50–8 | —0.14207 | |
| 50–9 | —0.04650 | |
| 50–10 | —0.00854 | |
| 50–11 | 0.03328 | |
| 50–12 | —0.03542 | |
| 50–13 | —0.01521 | |
| 50–14 | —0.00421 | |
| 50–15 | 0.00431 | |
| 50–16 | —0.03613 | |

TABLE II—Continued

| Logarithm generator | y | K |
|---|---|---|
| 50–17 | 0.01440 | |
| 50–18 | —0.01171 | |
| 50–19 | —0.00349 | |
| 50–20 | —0.00751 | |
| 50–21 | —0.00014 | |
| 50–22 | —0.00636 | |
| 50–23 | 0.00109 | |
| 50–24 | —0.00602 | |
| 50–25 | —0.00085 | |
| 50–26 | —0.00369 | |
| 50–27 | —0.00069 | |
| 50–28 | —0.00287 | |
| 50–29 | —0.00080 | |
| 50–30 | —0.00240 | |
| 50–31 | —0.00017 | |
| 50–32 | —0.00328 | |
| 50–33 | 0.00313 | |
| 50–34 | —0.00906 | |
| 50–35 | 0.01503 | |
| 50–36 | —0.02573 | |
| Combinor 60–12 | | |
| 50–1 | 0.03381 | —0.32258 |
| 50–2 | 0.00129 | |
| 50–3 | 0.22408 | |
| 50–4 | 0.03479 | |
| 50–5 | 0.07452 | |
| 50–6 | 0.02145 | |
| 50–7 | —0.00754 | |
| 50–8 | —0.16069 | |
| 50–9 | —0.09440 | |
| 50–10 | —0.02213 | |
| 50–11 | 0.03952 | |
| 50–12 | —0.03251 | |
| 50–13 | —0.01766 | |
| 50–14 | —0.00531 | |
| 50–15 | 0.00424 | |
| 50–16 | —0.03865 | |
| 50–17 | 0.01530 | |
| 50–18 | —0.01257 | |
| 50–19 | —0.00380 | |
| 50–20 | —0.00801 | |
| 50–21 | —0.00020 | |
| 50–22 | —0.00678 | |
| 50–23 | 0.00112 | |
| 50–24 | —0.00641 | |
| 50–25 | —0.00092 | |
| 50–26 | —0.00393 | |
| 50–27 | —0.00076 | |
| 50–28 | —0.00305 | |
| 50–29 | —0.00087 | |
| 50–30 | —0.00256 | |
| 50–31 | —0.00019 | |
| 50–32 | —0.00349 | |
| 50–33 | 0.00333 | |
| 50–34 | —0.00964 | |
| 50–35 | 0.01599 | |
| 50–36 | —0.02738 | |
| Combinor 60–13 | | |
| 50–1 | 0.03388 | —0.24435 |
| 50–2 | 0.00302 | |
| 50–3 | 0.20069 | |
| 50–4 | —0.01698 | |
| 50–5 | 0.11895 | |
| 50–6 | 0.04381 | |
| 50–7 | 0.02736 | |

TABLE II—Continued

| Logarithm generator | y | K |
|---|---|---|
| 50-8 | —0.09930 | |
| 50-9 | —0.15065 | |
| 50-10 | —0.05167 | |
| 50-11 | 0.04016 | |
| 50-12 | —0.02874 | |
| 50-13 | —0.01783 | |
| 50-14 | —0.00676 | |
| 50-15 | 0.00361 | |
| 50-16 | —0.04101 | |
| 50-17 | 0.01617 | |
| 50-18 | —0.01345 | |
| 50-19 | —0.00412 | |
| 50-20 | —0.00851 | |
| 50-21 | —0.00026 | |
| 50-22 | —0.00719 | |
| 50-23 | 0.00115 | |
| 50-24 | —0.00681 | |
| 50-25 | —0.00099 | |
| 50-26 | —0.00417 | |
| 50-27 | —0.00082 | |
| 50-28 | —0.00323 | |
| 50-29 | —0.00093 | |
| 50-30 | —0.00271 | |
| 50-31 | —0.00021 | |
| 50-32 | —0.00370 | |
| 50-33 | 0.00352 | |
| 50-34 | —0.01022 | |
| 50-35 | 0.01694 | |
| 50-36 | —0.02902 | |

Combinor 60-14

| Logarithm generator | y | K |
|---|---|---|
| 50-1 | 0.03329 | —0.16556 |
| 50-2 | 0.00528 | |
| 50-3 | 0.19136 | |
| 50-4 | —0.05724 | |
| 50-5 | 0.09800 | |
| 50-6 | 0.10633 | |
| 50-7 | 0.02967 | |
| 50-8 | —0.01560 | |
| 50-9 | —0.16925 | |
| 50-10 | —0.09931 | |
| 50-11 | 0.03068 | |
| 50-12 | —0.02701 | |
| 50-13 | —0.01478 | |
| 50-14 | —0.00814 | |
| 50-15 | 0.00232 | |
| 50-16 | —0.04326 | |
| 50-17 | 0.01700 | |
| 50-18 | —0.01437 | |
| 50-19 | —0.00444 | |
| 50-20 | —0.00901 | |
| 50-21 | —0.00033 | |
| 50-22 | —0.00760 | |
| 50-23 | 0.00117 | |
| 50-24 | —0.00719 | |
| 50-25 | —0.00107 | |
| 50-26 | —0.00440 | |
| 50-27 | —0.00088 | |
| 50-28 | —0.00340 | |
| 50-29 | —0.00100 | |
| 50-30 | —0.00285 | |
| 50-31 | —0.00023 | |
| 50-32 | —0.00391 | |
| 50-33 | 0.00371 | |
| 50-34 | —0.01078 | |
| 50-35 | 0.01787 | |
| 50-36 | —0.03062 | |

TABLE II—Continued

Combinor 60-15

| Logarithm generator | y | K |
|---|---|---|
| 50-1 | 0.03221 | —0.08608 |
| 50-2 | 0.00691 | |
| 50-3 | 0.18829 | |
| 50-4 | —0.07879 | |
| 50-5 | 0.04710 | |
| 50-6 | 0.15227 | |
| 50-7 | 0.05251 | |
| 50-8 | 0.01829 | |
| 50-9 | —0.10850 | |
| 50-10 | —0.15512 | |
| 50-11 | 0.00491 | |
| 50-12 | —0.03218 | |
| 50-13 | —0.00781 | |
| 50-14 | —0.00877 | |
| 50-15 | 0.00041 | |
| 50-16 | —0.04560 | |
| 50-17 | 0.01787 | |
| 50-18 | —0.01531 | |
| 50-19 | —0.00479 | |
| 50-20 | —0.00951 | |
| 50-21 | —0.00042 | |
| 50-22 | —0.00801 | |
| 50-23 | 0.00117 | |
| 50-24 | —0.00757 | |
| 50-25 | —0.00115 | |
| 50-26 | —0.00463 | |
| 50-27 | —0.00095 | |
| 50-28 | —0.00357 | |
| 50-29 | —0.00107 | |
| 50-30 | —0.00300 | |
| 50-31 | —0.00025 | |
| 50-32 | —0.00411 | |
| 50-33 | 0.00390 | |
| 50-34 | —0.01134 | |
| 50-35 | 0.01879 | |
| 50-36 | —0.03219 | |

Combinor 60-16

| Logarithm generator | y | K |
|---|---|---|
| 50-1 | 0.03085 | —0.00517 |
| 50-2 | 0.00740 | |
| 50-3 | 0.18684 | |
| 50-4 | —0.08494 | |
| 50-5 | 0.00653 | |
| 50-6 | 0.13147 | |
| 50-7 | 0.11609 | |
| 50-8 | 0.02032 | |
| 50-9 | —0.02585 | |
| 50-10 | —0.17337 | |
| 50-11 | —0.03989 | |
| 50-12 | —0.04876 | |
| 50-13 | 0.00109 | |
| 50-14 | —0.00784 | |
| 50-15 | —0.00162 | |
| 50-16 | —0.04840 | |
| 50-17 | 0.01886 | |
| 50-18 | —0.01629 | |
| 50-19 | —0.00518 | |
| 50-20 | —0.01001 | |
| 50-21 | —0.00052 | |
| 50-22 | —0.00841 | |
| 50-23 | 0.00117 | |
| 50-24 | —0.00795 | |
| 50-25 | —0.00124 | |
| 50-26 | —0.00486 | |
| 50-27 | —0.00103 | |
| 50-28 | —0.00374 | |

TABLE II—Continued

| Logarithm generator | y | K |
|---|---|---|
| 50-29 | —0.00115 | |
| 50-30 | —0.00314 | |
| 50-31 | —0.00028 | |
| 50-32 | —0.00431 | |
| 50-33 | —0.00408 | |
| 50-34 | —0.01189 | |
| 50-35 | 0.01969 | |
| 50-36 | —0.03375 | |
| | Combinor 60-17 | |
| 50-1 | 0.02940 | +0.07896 |
| 50-2 | 0.00699 | |
| 50-3 | 0.18432 | |
| 50-4 | —0.08208 | |
| 50-5 | —0.01641 | |
| 50-6 | 0.07975 | |
| 50-7 | 0.16268 | |
| 50-8 | 0.04348 | |
| 50-9 | 0.00712 | |
| 50-10 | —0.11277 | |
| 50-11 | —0.09454 | |
| 50-12 | —0.08275 | |
| 50-13 | 0.00779 | |
| 50-14 | —0.00430 | |
| 50-15 | —0.00280 | |
| 50-16 | —0.05222 | |
| 57-17 | 0.02009 | |
| 50-18 | —0.01728 | |
| 50-19 | —0.00564 | |
| 50-20 | —0.01050 | |
| 50-21 | —0.00066 | |
| 50-22 | —0.00881 | |
| 50-23 | 0.00114 | |
| 50-24 | —0.00833 | |
| 50-25 | —0.00134 | |
| 50-26 | —0.00509 | |
| 50-27 | —0.00111 | |
| 50-28 | —0.00390 | |
| 50-29 | —0.00123 | |
| 50-30 | —0.00328 | |
| 50-31 | —0.00031 | |
| 50-32 | —0.00450 | |
| 50-33 | 0.00426 | |
| 50-34 | —0.01244 | |
| 50-35 | 0.02061 | |
| 50-36 | —0.03553 | |
| | Combinor 60-18 | |
| 50-1 | 0.02802 | 0.16695 |
| 50-2 | 0.00600 | |
| 50-3 | 0.17948 | |
| 50-4 | —0.07466 | |
| 50-5 | —0.02481 | |
| 50-6 | 0.03782 | |
| 50-7 | 0.14174 | |
| 50-8 | 0.10783 | |
| 50-9 | 0.00824 | |
| 50-10 | —0.03086 | |
| 50-11 | —0.11391 | |
| 50-12 | —0.13557 | |
| 50-13 | 0.00521 | |
| 50-14 | 0.00212 | |
| 50-15 | —0.00181 | |
| 50-16 | —0.05758 | |
| 50-17 | 0.02163 | |
| 50-18 | —0.01825 | |
| 50-19 | —0.00622 | |

TABLE II—Continued

| Logarithm generator | y | K |
|---|---|---|
| 50-20 | —0.01098 | |
| 50-21 | —0.00083 | |
| 50-22 | —0.00921 | |
| 50-23 | 0.00108 | |
| 50-24 | —0.00871 | |
| 50-25 | —0.00145 | |
| 50-26 | —0.00532 | |
| 50-27 | —0.00121 | |
| 50-28 | —0.00406 | |
| 50-29 | —0.00132 | |
| 50-30 | —0.00342 | |
| 50-31 | —0.00035 | |
| 50-32 | —0.00470 | |
| 50-33 | 0.00444 | |
| 50-34 | —0.01300 | |
| 50-35 | 0.02152 | |
| 50-36 | —0.03691 | |
| | Combinor 60-19 | |
| 50-1 | 0.02674 | 0.25586 |
| 50-2 | 0.00487 | |
| 50-3 | 0.17272 | |
| 50-4 | —0.06651 | |
| 50-5 | —0.02459 | |
| 50-6 | 0.01343 | |
| 50-7 | 0.08958 | |
| 50-8 | 0.15488 | |
| 50-9 | 0.03005 | |
| 50-10 | 0.00092 | |
| 50-11 | —0.05619 | |
| 50-12 | —0.19580 | |
| 50-13 | —0.01808 | |
| 50-14 | 0.01053 | |
| 50-15 | 0.00293 | |
| 50-16 | —0.06476 | |
| 50-17 | 0.02346 | |
| 50-18 | —0.01915 | |
| 50-19 | —0.00692 | |
| 50-20 | —0.01143 | |
| 50-21 | —0.00106 | |
| 50-22 | —0.00960 | |
| 50-23 | 0.00099 | |
| 50-24 | —0.00908 | |
| 50-25 | —0.00157 | |
| 50-26 | —0.00555 | |
| 50-27 | —0.00132 | |
| 50-28 | —0.00422 | |
| 50-29 | —0.00143 | |
| 50-30 | —0.00355 | |
| 50-31 | —0.00039 | |
| 50-32 | —0.00490 | |
| 50-33 | 0.00462 | |
| 50-34 | —0.01356 | |
| 50-35 | 0.02243 | |
| 50-36 | —0.03849 | |
| | Combinor 60-20 | |
| 50-1 | 0.02563 | 0.33289 |
| 50-2 | 0.00387 | |
| 50-3 | 0.16494 | |
| 50-4 | —0.06004 | |
| 50-5 | —0.01982 | |
| 50-6 | 0.00382 | |
| 50-7 | 0.04738 | |
| 50-8 | 0.13360 | |
| 50-9 | 0.09212 | |

TABLE II—Continued

| Logarithm generator | y | K |
|---|---|---|
| 50–10 | 0.00047 | |
| 50–11 | 0.02527 | |
| 50–12 | −0.21480 | |
| 50–13 | −0.07370 | |
| 50–14 | 0.01659 | |
| 50–15 | 0.01149 | |
| 50–16 | −0.07268 | |
| 50–17 | 0.02521 | |
| 50–18 | −0.01992 | |
| 50–19 | −0.00769 | |
| 50–20 | −0.01185 | |
| 50–21 | −0.00130 | |
| 50–22 | −0.00997 | |
| 50–23 | 0.00088 | |
| 50–24 | −0.00945 | |
| 50–25 | −0.00171 | |
| 50–26 | −0.00577 | |
| 50–27 | −0.00144 | |
| 50–28 | −0.00436 | |
| 50–29 | −0.00153 | |
| 50–30 | −0.00368 | |
| 50–31 | −0.00044 | |
| 50–32 | −0.00509 | |
| 50–33 | 0.00479 | |
| 50–34 | −0.01410 | |
| 50–35 | 0.02331 | |
| 50–36 | −0.04002 | |

Combinor 60–21

| | | |
|---|---|---|
| 50–1 | 0.02468 | 0.38630 |
| 50–2 | 0.00313 | |
| 50–3 | 0.15722 | |
| 50–4 | −0.05580 | |
| 50–5 | −0.01414 | |
| 50–6 | 0.00333 | |
| 50–7 | 0.02312 | |
| 50–8 | 0.08027 | |
| 50–9 | 0.13485 | |
| 50–10 | 0.02040 | |
| 50–11 | 0.06467 | |
| 50–12 | −0.14519 | |
| 50–13 | −0.16566 | |
| 50–14 | 0.01398 | |
| 50–15 | 0.02264 | |
| 50–16 | −0.07964 | |
| 50–17 | 0.02638 | |
| 50–18 | −0.02061 | |
| 50–19 | −0.00844 | |
| 50–20 | −0.01226 | |
| 50–21 | −0.00153 | |
| 50–22 | −0.01033 | |
| 50–23 | 0.00077 | |
| 50–24 | −0.00979 | |
| 50–25 | −0.00183 | |
| 50–26 | −0.00598 | |
| 50–27 | −0.00155 | |
| 50–28 | −0.00450 | |
| 50–29 | −0.00164 | |
| 50–30 | −0.00380 | |
| 50–31 | −0.00049 | |
| 50–32 | −0.00527 | |
| 50–33 | 0.00495 | |
| 50–34 | −0.01460 | |
| 50–35 | 0.02414 | |
| 50–36 | −0.04147 | |

TABLE II—Continued

Combinor 60–22

| Logarithm generator | y | K |
|---|---|---|
| 50–1 | 0.02381 | 0.43219 |
| 50–2 | 0.00264 | |
| 50–3 | 0.14984 | |
| 50–4 | −0.05359 | |
| 50–5 | −0.00970 | |
| 50–6 | 0.00790 | |
| 50–7 | 0.01382 | |
| 50–8 | 0.03575 | |
| 50–9 | 0.10650 | |
| 50–10 | 0.08064 | |
| 50–11 | 0.08086 | |
| 50–12 | −0.03435 | |
| 50–13 | −0.25755 | |
| 50–14 | −0.00117 | |
| 50–15 | 0.03174 | |
| 50–16 | −0.08442 | |
| 50–17 | 0.02676 | |
| 50–18 | −0.02147 | |
| 50–19 | −0.00918 | |
| 50–20 | −0.01272 | |
| 50–21 | −0.00178 | |
| 50–22 | −0.01071 | |
| 50–23 | 0.00065 | |
| 50–24 | −0.01015 | |
| 50–25 | −0.00197 | |
| 50–26 | −0.00620 | |
| 50–27 | −0.00167 | |
| 50–28 | −0.00464 | |
| 50–29 | −0.00175 | |
| 50–30 | −0.00393 | |
| 50–31 | −0.00054 | |
| 50–32 | −0.00546 | |
| 50–33 | 0.00511 | |
| 50–34 | −0.01512 | |
| 50–35 | 0.02499 | |
| 50–36 | −0.04294 | |

Combinor 60–23

| | | |
|---|---|---|
| 50–1 | 0.02291 | 0.50145 |
| 50–2 | 0.00234 | |
| 50–3 | 0.14258 | |
| 50–4 | −0.05262 | |
| 50–5 | −0.00760 | |
| 50–6 | 0.01343 | |
| 50–7 | 0.01522 | |
| 50–8 | 0.01258 | |
| 50–9 | 0.04407 | |
| 50–10 | 0.10080 | |
| 50–11 | 0.14502 | |
| 50–12 | 0.03234 | |
| 50–13 | −0.27468 | |
| 50–14 | −0.04003 | |
| 50–15 | 0.02806 | |
| 50–16 | −0.08370 | |
| 50–17 | 0.02566 | |
| 50–18 | −0.02310 | |
| 50–19 | −0.00992 | |
| 50–20 | −0.01338 | |
| 50–21 | −0.00209 | |
| 50–22 | −0.01119 | |
| 50–23 | 0.00051 | |
| 50–24 | −0.01060 | |
| 50–25 | −0.00213 | |
| 50–26 | −0.00646 | |
| 50–27 | −0.00181 | |
| 50–28 | −0.00482 | |

TABLE II—Continued

| Logarithm generator | y | K |
|---|---|---|
| 50–29 | —0.00188 | |
| 50–30 | —0.00408 | |
| 50–31 | —0.00060 | |
| 50–32 | —0.00568 | |
| 50–33 | 0.00530 | |
| 50–34 | —0.01575 | |
| 50–35 | 0.02601 | |
| 50–36 | —0.04472 | |
| | Combinor 60–24 | |
| 50–1 | 0.02193 | 0.60316 |
| 50–2 | 0.00207 | |
| 50–3 | 0.13551 | |
| 50–4 | —0.05174 | |
| 50–5 | —0.00751 | |
| 50–6 | 0.01636 | |
| 50–7 | 0.01979 | |
| 50–8 | 0.00548 | |
| 50–9 | 0.00523 | |
| 50–10 | 0.04518 | |
| 50–11 | 0.24275 | |
| 50–12 | 0.03314 | |
| 50–13 | —0.17800 | |
| 50–14 | —0.10158 | |
| 50–15 | —0.00176 | |
| 50–16 | —0.07374 | |
| 50–17 | 0.02259 | |
| 50–18 | —0.02602 | |
| 50–19 | —0.01056 | |
| 50–20 | —0.01435 | |
| 50–21 | —0.00246 | |
| 50–22 | —0.01182 | |
| 50–23 | 0.00032 | |
| 50–24 | —0.01115 | |
| 50–25 | —0.00234 | |
| 50–26 | —0.00680 | |
| 50–27 | —0.00199 | |
| 50–28 | —0.00503 | |
| 50–29 | —0.00204 | |
| 50–30 | —0.00426 | |
| 50–31 | —0.00067 | |
| 50–32 | —0.00596 | |
| 50–33 | 0.00554 | |
| 50–34 | —0.01652 | |
| 50–35 | 0.02726 | |
| 50–36 | —0.04689 | |
| | Combinor 60–25 | |
| 50–1 | 0.02102 | 0.69293 |
| 50–2 | 0.00177 | |
| 50–3 | 0.12930 | |
| 50–4 | —0.05049 | |
| 50–5 | —0.00827 | |
| 50–6 | 0.01605 | |
| 50–7 | 0.02219 | |
| 50–8 | 0.00735 | |
| 50–9 | —0.00651 | |
| 50–10 | 0.00396 | |
| 50–11 | 0.22999 | |
| 50–12 | 0.06337 | |
| 50–13 | —0.05931 | |
| 50–14 | —0.09925 | |
| 50–15 | —0.08962 | |
| 50–16 | —0.05440 | |
| 50-17 | 0.01996 | |
| 50–18 | —0.03083 | |
| 50–19 | —0.01081 | |

TABLE II—Continued

| Logarithm generator | y | K |
|---|---|---|
| 50–20 | —0.01555 | |
| 50–21 | —0.00284 | |
| 50–22 | —0.01251 | |
| 50–23 | 0.00012 | |
| 50–24 | —0.01176 | |
| 50–25 | —0.00255 | |
| 50–26 | —0.00715 | |
| 50–27 | —0.00217 | |
| 50–28 | —0.00526 | |
| 50–29 | —0.00220 | |
| 50–30 | —0.00446 | |
| 50–31 | —0.00075 | |
| 50–32 | —0.00625 | |
| 50–33 | 0.00579 | |
| 50–34 | —0.01733 | |
| 50–35 | 0.02858 | |
| 50–36 | —0.04919 | |
| | Combinor 60–26 | |
| 50–1 | 0.02018 | 0.74879 |
| 50–2 | 0.00151 | |
| 50–3 | 0.12401 | |
| 50–4 | —0.04896 | |
| 50–5 | —0.00924 | |
| 50–6 | 0.01392 | |
| 50–7 | 0.02254 | |
| 50–8 | 0.01324 | |
| 50–9 | —0.00282 | |
| 50–10 | —0.00865 | |
| 50–11 | 0.12400 | |
| 50–12 | 0.14415 | |
| 50–13 | —0.01036 | |
| 50–14 | 0.00662 | |
| 50–15 | —0.20510 | |
| 50–16 | —0.05003 | |
| 50–17 | 0.02444 | |
| 50–18 | —0.03641 | |
| 50–19 | —0.01129 | |
| 50–20 | —0.01670 | |
| 50–21 | —0.00330 | |
| 50–22 | —0.01318 | |
| 50–23 | —0.00013 | |
| 50–24 | —0.01234 | |
| 50–25 | —0.00279 | |
| 50–26 | —0.00749 | |
| 50–27 | —0.00237 | |
| 50–28 | —0.00548 | |
| 50–29 | —0.00238 | |
| 50–30 | —0.00465 | |
| 50–31 | —0.00083 | |
| 50–32 | —0.00652 | |
| 50–33 | 0.00603 | |
| 50–34 | —0.01810 | |
| 50–35 | 0.02985 | |
| 50–36 | —0.05139 | |
| | Combinor 60–27 | |
| 50–1 | 0.01927 | 0.83316 |
| 50–2 | 0.00120 | |
| 50–3 | 0.11824 | |
| 50–4 | —0.04690 | |
| 50–5 | —0.00973 | |
| 50–6 | 0.01130 | |
| 50–7 | 0.02035 | |
| 50–8 | 0.01662 | |
| 50–9 | 0.00606 | |
| 50–10 | —0.00383 | |

TABLE II—Continued

| Logarithm generator | y | K |
|---|---|---|
| 50-11 | 0.04508 | |
| 50-12 | 0.12505 | |
| 50-13 | 0.09367 | |
| 50-14 | 0.05352 | |
| 50-15 | —0.20895 | |
| 50-16 | —0.11341 | |
| 50-17 | 0.04450 | |
| 50-18 | —0.03931 | |
| 50-19 | —0.01410 | |
| 50-20 | —0.01739 | |
| 50-21 | —0.00410 | |
| 50-22 | —0.01387 | |
| 50-23 | —0.00050 | |
| 50-24 | —0.01299 | |
| 50-25 | —0.00308 | |
| 50-26 | —0.00788 | |
| 50-27 | —0.00262 | |
| 50-28 | —0.00571 | |
| 50-29 | —0.00260 | |
| 50-30 | —0.00486 | |
| 50-31 | —0.00094 | |
| 50-32 | —0.00683 | |
| 50-33 | 0.00629 | |
| 50-34 | —0.01898 | |
| 50-35 | 0.03126 | |
| 50-36 | —0.05386 | |

Combinor 60-28

| Logarithm generator | y | K |
|---|---|---|
| 50-1 | 0.01833 | 0.91334 |
| 50-2 | 0.00098 | |
| 50-3 | 0.11225 | |
| 50-4 | —0.04464 | |
| 50-5 | —0.00960 | |
| 50-6 | 0.00956 | |
| 50-7 | 0.01772 | |
| 50-8 | 0.01622 | |
| 50-9 | 0.01078 | |
| 50-10 | 0.00267 | |
| 50-11 | 0.02451 | |
| 50-12 | 0.06231 | |
| 50-13 | 0.13229 | |
| 50-14 | 0.07675 | |
| 50-15 | —0.07063 | |
| 50-16 | —0.25577 | |
| 50-17 | 0.07903 | |
| 50-18 | —0.03762 | |
| 50-19 | —0.01982 | |
| 50-20 | —0.01734 | |
| 50-21 | —0.00528 | |
| 50-22 | —0.01448 | |
| 50-23 | —0.00101 | |
| 50-24 | —0.01362 | |
| 50-25 | —0.00343 | |
| 50-26 | —0.00825 | |
| 50-27 | —0.00292 | |
| 50-28 | —0.00592 | |
| 50-29 | —0.00286 | |
| 50-30 | —0.00505 | |
| 50-31 | —0.00107 | |
| 50-32 | —0.00714 | |
| 50-33 | 0.00654 | |
| 50-34 | —0.01984 | |
| 50-35 | 0.03265 | |
| 50-36 | —0.05631 | |

TABLE II—Continued

Combinor 60-29

| Logarithm generator | y | K |
|---|---|---|
| 50-1 | 0.01747 | 0.95779 |
| 50-2 | 0.00088 | |
| 50-3 | 0.10685 | |
| 50-4 | —0.04259 | |
| 50-5 | —0.00918 | |
| 50-6 | 0.00886 | |
| 50-7 | 0.01599 | |
| 50-8 | 0.01414 | |
| 50-9 | 0.01028 | |
| 50-10 | 0.00530 | |
| 50-11 | 0.03180 | |
| 50-12 | 0.03349 | |
| 50-13 | 0.02703 | |
| 50-14 | 0.18610 | |
| 50-15 | 0.05736 | |
| 50-16 | —0.35489 | |
| 50-17 | 0.08173 | |
| 50-18 | —0.03240 | |
| 50-19 | —0.02604 | |
| 50-20 | —0.01749 | |
| 50-21 | —0.00648 | |
| 50-22 | —0.01515 | |
| 50-23 | —0.00153 | |
| 50-24 | —0.01427 | |
| 50-25 | —0.00377 | |
| 50-26 | —0.00863 | |
| 50-27 | —0.00321 | |
| 50-28 | —0.00613 | |
| 50-29 | —0.00310 | |
| 50-30 | —0.00524 | |
| 50-31 | —0.00119 | |
| 50-32 | —0.00743 | |
| 50-33 | 0.00678 | |
| 50-34 | —0.02067 | |
| 50-35 | 0.03398 | |
| 50-36 | —0.05865 | |

Combinor 60-30

| Logarithm generator | y | K |
|---|---|---|
| 50-1 | 0.01672 | 1.0077 |
| 50-2 | 0.00075 | |
| 50-3 | 0.10201 | |
| 50-4 | —0.04089 | |
| 50-5 | —0.00881 | |
| 50-6 | 0.00849 | |
| 50-7 | 0.01494 | |
| 50-8 | 0.01213 | |
| 50-9 | 0.00788 | |
| 50-10 | 0.00472 | |
| 50-11 | 0.04138 | |
| 50-12 | 0.03024 | |
| 50-13 | —0.05992 | |
| 50-14 | 0.19917 | |
| 50-15 | 0.19032 | |
| 50-16 | —0.33226 | |
| 50-17 | 0.00629 | |
| 50-18 | —0.01995 | |
| 50-19 | —0.03264 | |
| 50-20 | —0.01835 | |
| 50-21 | —0.00768 | |
| 50-22 | —0.01608 | |
| 50-23 | —0.00203 | |
| 50-24 | —0.01506 | |
| 50-25 | —0.00413 | |
| 50-26 | —0.00908 | |
| 50-27 | —0.00350 | |
| 50-28 | —0.00640 | |
| 50-29 | —0.00335 | |

TABLE II—Continued

| Logarithm generator | y | K |
|---|---|---|
| 50–30 | —0.00547 | |
| 50–31 | —0.00131 | |
| 50–32 | —0.00777 | |
| 50–33 | 0.00706 | |
| 50–34 | —0.02160 | |
| 50–35 | 0.03549 | |
| 50–36 | —0.06130 | |
| Combinor 60–31 | | |
| 50–1 | 0.01607 | 1.0809 |
| 50–2 | 0.00050 | |
| 50–3 | 0.09766 | |
| 50–4 | —0.03954 | |
| 50–5 | —0.00865 | |
| 50–6 | 0.00809 | |
| 50–7 | 0.01425 | |
| 50–8 | 0.01089 | |
| 50–9 | 0.00560 | |
| 50–10 | 0.00233 | |
| 50–11 | 0.04281 | |
| 50–12 | 0.04009 | |
| 50–13 | —0.06624 | |
| 50–14 | 0.08044 | |
| 50–15 | 0.30244 | |
| 50–16 | —0.17876 | |
| 50–17 | —0.12120 | |
| 50–18 | —0.02061 | |
| 50–19 | —0.03391 | |
| 50–20 | —0.02161 | |
| 50–21 | —0.00855 | |
| 50–22 | —0.01745 | |
| 50–23 | —0.00250 | |
| 50–24 | —0.01607 | |
| 50–25 | —0.00450 | |
| 50–26 | —0.00963 | |
| 50–27 | —0.00379 | |
| 50–28 | —0.00674 | |
| 50–29 | —0.00360 | |
| 50–30 | —0.00575 | |
| 50–31 | —0.00143 | |
| 50–32 | —0.00817 | |
| 50–33 | 0.00739 | |
| 50–34 | —0.02271 | |
| 50–35 | 0.03728 | |
| 50–36 | —0.06442 | |
| Combinor 60–32 | | |
| 50–1 | 0.01544 | 1.1675 |
| 50–2 | 0.00026 | |
| 50–3 | 0.09346 | |
| 50–4 | —0.03819 | |
| 50–5 | —0.00853 | |
| 50–6 | 0.00756 | |
| 50–7 | 0.01350 | |
| 50–8 | 0.01018 | |
| 50–9 | 0.00461 | |
| 50–10 | 0.00099 | |
| 50–11 | 0.03874 | |
| 50–12 | 0.04434 | |
| 50–13 | —0.05317 | |
| 50–14 | 0.01631 | |
| 50–15 | 0.28436 | |
| 50–16 | —0.04115 | |
| 50–17 | —0.08735 | |
| 50–18 | —0.12108 | |
| 50–19 | —0.00844 | |
| 50–20 | —0.03274 | |

TABLE II—Continued

| Logarithm generator | y | K |
|---|---|---|
| 50–21 | —0.00789 | |
| 50–22 | —0.01970 | |
| 50–23 | —0.00292 | |
| 50–24 | —0.01728 | |
| 50–25 | —0.00493 | |
| 50–26 | —0.01026 | |
| 50–27 | —0.00413 | |
| 50–28 | —0.00712 | |
| 50–29 | —0.00389 | |
| 50–30 | —0.00607 | |
| 50–31 | —0.00156 | |
| 50–32 | —0.00861 | |
| 50–33 | 0.00775 | |
| 50–34 | —0.02391 | |
| 50–35 | 0.03923 | |
| 50–36 | —0.06782 | |
| Combinor 60–33 | | |
| 50–1 | 0.01482 | 1.2536 |
| 50–2 | 0.00004 | |
| 50–3 | 0.08942 | |
| 50–4 | —0.03684 | |
| 50–5 | —0.00840 | |
| 50–6 | 0.00693 | |
| 50–7 | 0.01266 | |
| 50–8 | 0.00978 | |
| 50–9 | 0.00471 | |
| 50–10 | 0.00092 | |
| 50–11 | 0.03162 | |
| 50–12 | 0.04196 | |
| 50–13 | —0.04050 | |
| 50–14 | 0.02578 | |
| 50–15 | 0.15876 | |
| 50–16 | 0.06599 | |
| 50–17 | 0.05644 | |
| 50–18 | —0.25525 | |
| 50–19 | 0.01374 | |
| 50–20 | —0.04345 | |
| 50–21 | —0.00802 | |
| 50–22 | —0.02203 | |
| 50–23 | —0.00356 | |
| 50–24 | —0.01858 | |
| 50–25 | —0.00543 | |
| 50–26 | —0.01094 | |
| 50–27 | —0.00452 | |
| 50–28 | —0.00751 | |
| 50–29 | —0.00422 | |
| 50–30 | —0.00639 | |
| 50–31 | —0.00172 | |
| 50–32 | —0.00906 | |
| 50–33 | 0.00813 | |
| 50–34 | —0.02517 | |
| 50–35 | 0.04125 | |
| 50–36 | —0.07136 | |
| Combinor 60–34 | | |
| 50–1 | 0.01420 | 1.3156 |
| 50–2 | —0.00012 | |
| 50–3 | 0.08547 | |
| 50–4 | —0.03542 | |
| 50–5 | —0.00822 | |
| 50–6 | 0.00638 | |
| 50–7 | 0.01186 | |
| 50–8 | 0.00939 | |
| 50–9 | 0.00491 | |
| 50–10 | 0.00114 | |
| 50–11 | 0.02583 | |

TABLE II—Continued

| Logarithm generator | y | K |
|---|---|---|
| 50–12 | 0.03799 | |
| 50–13 | —0.03377 | |
| 50–14 | 0.04971 | |
| 50–15 | 0.05700 | |
| 50–16 | 0.07753 | |
| 50–17 | 0.20037 | |
| 50–18 | —0.26342 | |
| 50–19 | —0.04328 | |
| 50–20 | —0.03262 | |
| 50–21 | —0.01491 | |
| 50–22 | —0.02250 | |
| 50–23 | —0.00503 | |
| 50–24 | —0.01973 | |
| 50–25 | —0.00607 | |
| 50–26 | —0.01160 | |
| 50–27 | —0.00497 | |
| 50–28 | —0.00789 | |
| 50–29 | —0.00458 | |
| 50–30 | —0.00671 | |
| 50–31 | —0.00190 | |
| 50–32 | —0.00951 | |
| 50–33 | 0.00848 | |
| 50–34 | —0.02641 | |
| 50–35 | 0.04324 | |
| 50–36 | —0.07486 | |
| | Combinor 60–35 | |
| 50–1 | 0.01356 | 1.3519 |
| 50–2 | —0.00019 | |
| 50–3 | 0.08149 | |
| 50–4 | —0.03390 | |
| 50–5 | —0.00793 | |
| 50–6 | 0.00597 | |
| 50–7 | 0.01116 | |
| 50–8 | 0.00880 | |
| 50–9 | 0.00456 | |
| 50–10 | 0.00103 | |
| 50–11 | 0.02404 | |
| 50–12 | 0.03541 | |
| 50–13 | —0.03614 | |
| 50–14 | 0.05021 | |
| 50–15 | 0.06100 | |
| 50–16 | —0.05159 | |
| 50–17 | 0.30928 | |
| 50–18 | —0.10355 | |
| 50–19 | —0.18351 | |
| 50–20 | —0.00364 | |
| 50–21 | —0.02782 | |
| 50–22 | —0.02144 | |
| 50–23 | —0.00731 | |
| 50–24 | —0.02075 | |
| 50–25 | —0.00686 | |
| 50–26 | —0.01223 | |
| 50–27 | —0.00551 | |
| 50–28 | —0.00822 | |
| 50–29 | —0.00501 | |
| 50–30 | —0.00700 | |
| 50–31 | —0.00211 | |
| 50–32 | —0.00994 | |
| 50–33 | 0.00881 | |
| 50–34 | —0.02760 | |
| 50–35 | 0.04515 | |
| 50–36 | —0.07824 | |
| | Combinor 60–36 | |
| 50–1 | 0.01298 | 1.4036 |
| 50–2 | —0.00027 | |

TABLE II—Continued

| Logarithm generator | y | K |
|---|---|---|
| 50–3 | 0.07784 | |
| 50–4 | —0.03253 | |
| 50–5 | —0.00768 | |
| 50–6 | 0.00561 | |
| 50–7 | 0.01055 | |
| 50–8 | 0.00826 | |
| 50–9 | 0.00417 | |
| 50–10 | 0.00080 | |
| 50–11 | 0.02252 | |
| 50–12 | 0.03415 | |
| 50–13 | —0.03656 | |
| 50–14 | 0.04236 | |
| 50–15 | 0.06927 | |
| 50–16 | —0.06639 | |
| 50–17 | 0.18672 | |
| 50–18 | 0.16516 | |
| 50–19 | —0.28028 | |
| 50–20 | —0.01438 | |
| 50–21 | —0.03082 | |
| 50–22 | —0.02489 | |
| 50–23 | —0.00863 | |
| 50–24 | —0.02251 | |
| 50–25 | —0.00760 | |
| 50–26 | —0.01308 | |
| 50–27 | —0.00605 | |
| 50–28 | —0.00867 | |
| 50–29 | —0.00543 | |
| 50–30 | —0.00736 | |
| 50–31 | —0.00232 | |
| 50–32 | —0.01044 | |
| 50–33 | 0.00919 | |
| 50–34 | —0.02896 | |
| 50–35 | 0.04732 | |
| 50–36 | —0.08207 | |
| | Combinor 60–37 | |
| 50–1 | 0.01244 | 1.5271 |
| 50–2 | —0.00041 | |
| 50–3 | 0.07437 | |
| 50–4 | —0.03128 | |
| 50–5 | —0.00747 | |
| 50–6 | 0.00524 | |
| 50–7 | 0.00996 | |
| 50–8 | 0.00778 | |
| 50–9 | 0.00385 | |
| 50–10 | 0.00061 | |
| 50–11 | 0.02054 | |
| 50–12 | 0.03356 | |
| 50–13 | —0.03588 | |
| 50–14 | 0.03546 | |
| 50–15 | 0.06797 | |
| 50–16 | —0.03496 | |
| 50–17 | 0.04435 | |
| 50–18 | 0.28094 | |
| 50–19 | —0.14266 | |
| 50–20 | —0.14463 | |
| 50–21 | —0.00328 | |
| 50–22 | —0.04007 | |
| 50–23 | —0.00727 | |
| 50–24 | —0.02575 | |
| 50–25 | —0.00823 | |
| 50–26 | —0.01430 | |
| 50–27 | —0.00665 | |
| 50–28 | —0.00926 | |
| 50–29 | —0.00594 | |
| 50–30 | —0.00781 | |
| 50–31 | —0.00257 | |
| 50–32 | —0.01104 | |

TABLE II—Continued

| Logarithm generator | y | K |
|---|---|---|
| 50-33 | 0.00964 | |
| 50-34 | —0.03057 | |
| 50-35 | 0.04988 | |
| 50-36 | —0.08657 | |
| | Combinor 60-38 | |
| 50-1 | 0.01189 | 1.7015 |
| 50-2 | —0.00053 | |
| 50-3 | 0.07089 | |
| 50-4 | —0.03002 | |
| 50-5 | —0.00725 | |
| 50-6 | 0.00487 | |
| 50-7 | 0.00937 | |
| 50-8 | 0.00733 | |
| 50-9 | 0.00362 | |
| 50-10 | 0.00053 | |
| 50-11 | 0.01841 | |
| 50-12 | 0.03240 | |
| 50-13 | —0.03492 | |
| 50-14 | 0.03413 | |
| 50-15 | 0.05812 | |
| 50-16 | —0.03311 | |
| 50-17 | 0.05257 | |
| 50-18 | 0.13304 | |
| 50-19 | 0.16888 | |
| 50-20 | —0.27980 | |
| 50-21 | —0.00042 | |
| 50-22 | —0.04946 | |
| 50-23 | —0.00909 | |
| 50-24 | —0.02880 | |
| 50-25 | —0.00932 | |
| 50-26 | —0.01560 | |
| 50-27 | —0.00740 | |
| 50-28 | —0.00991 | |
| 50-29 | —0.00652 | |
| 50-30 | —0.00831 | |
| 50-31 | —0.00285 | |
| 50-32 | —0.01170 | |
| 50-33 | 0.01013 | |
| 50-34 | —0.03233 | |
| 50-35 | 0.05269 | |
| 50-36 | —0.09154 | |
| | Combinor 60-39 | |
| 50-1 | 0.01142 | 1.8008 |
| 50-2 | —0.00062 | |
| 50-3 | 0.06787 | |
| 50-4 | —0.02889 | |
| 50-5 | —0.00704 | |
| 50-6 | 0.00457 | |
| 50-7 | 0.00888 | |
| 50-8 | 0.00696 | |
| 50-9 | 0.00344 | |
| 50-10 | 0.00047 | |
| 50-11 | 0.01671 | |
| 50-12 | 0.03129 | |
| 50-13 | —0.03406 | |
| 50-14 | 0.03360 | |
| 50-15 | 0.05017 | |
| 50-16 | —0.03723 | |
| 50-17 | 0.07861 | |
| 50-18 | 0.01868 | |
| 50-19 | 0.24738 | |
| 50-20 | —0.11261 | |
| 50-21 | —0.14922 | |
| 50-22 | —0.01309 | |
| 50-23 | —0.02706 | |

TABLE II—Continued

| Logarithm generator | y | K |
|---|---|---|
| 50-24 | —0.02753 | |
| 50-25 | —0.01206 | |
| 50-26 | —0.01618 | |
| 50-27 | —0.00849 | |
| 50-28 | —0.01037 | |
| 50-29 | —0.00718 | |
| 50-30 | —0.00874 | |
| 50-31 | —0.00315 | |
| 50-32 | —0.01230 | |
| 50-33 | 0.01056 | |
| 50-34 | —0.03396 | |
| 50-35 | 0.05527 | |
| 50-36 | —0.09611 | |
| | Combinor 60-40 | |
| 50-1 | 0.01096 | 1.8434 |
| 50-2 | —0.00067 | |
| 50-3 | 0.06508 | |
| 50-4 | —0.02780 | |
| 50-5 | —0.00682 | |
| 50-6 | 0.00432 | |
| 50-7 | 0.00845 | |
| 50-8 | 0.00662 | |
| 50-9 | 0.00326 | |
| 50-10 | 0.00041 | |
| 50-11 | 0.01554 | |
| 50-12 | 0.03013 | |
| 50-13 | —0.03303 | |
| 50-14 | 0.03169 | |
| 50-15 | 0.04676 | |
| 50-16 | —0.03545 | |
| 50-17 | 0.06755 | |
| 50-18 | 0.02628 | |
| 50-19 | 0.10264 | |
| 50-20 | 0.18394 | |
| 50-21 | —0.27035 | |
| 50-22 | —0.01246 | |
| 50-23 | —0.03452 | |
| 50-24 | —0.03020 | |
| 50-25 | —0.01377 | |
| 50-26 | —0.01743 | |
| 50-27 | —0.00940 | |
| 50-28 | —0.01098 | |
| 50-29 | —0.00782 | |
| 50-30 | —0.00921 | |
| 50-31 | —0.00346 | |
| 50-32 | —0.01291 | |
| 50-33 | 0.01098 | |
| 50-34 | —0.03556 | |
| 50-35 | 0.05779 | |
| 50-36 | —0.10058 | |
| | Combinor 60-41 | |
| 50-1 | 0.01049 | 1.9276 |
| 50-2 | —0.00071 | |
| 50-3 | 0.06219 | |
| 50-4 | —0.02666 | |
| 50-5 | —0.00658 | |
| 50-6 | 0.00407 | |
| 50-7 | 0.00802 | |
| 50-8 | 0.00628 | |
| 50-9 | 0.00308 | |
| 50-10 | 0.00035 | |
| 50-11 | 0.01440 | |
| 50-12 | 0.02899 | |
| 50-13 | —0.03196 | |
| 50-14 | 0.02964 | |

TABLE II—Continued

| Logarithm generator | y | K |
|---|---|---|
| 50–15 | 0.04404 | |
| 50–16 | —0.03259 | |
| 50–17 | 0.05241 | |
| 50–18 | 0.04889 | |
| 50–19 | —0.01094 | |
| 50–20 | 0.26299 | |
| 50–21 | —0.08860 | |
| 50–22 | —0.17708 | |
| 50–23 | 0.00932 | |
| 50–24 | —0.04954 | |
| 50–25 | —0.01053 | |
| 50–26 | —0.02154 | |
| 50–27 | —0.00951 | |
| 50–28 | —0.01224 | |
| 50–29 | —0.00842 | |
| 50–30 | —0.00986 | |
| 50–31 | —0.00383 | |
| 50–32 | —0.01362 | |
| 50–33 | 0.01144 | |
| 50–34 | —0.03739 | |
| 50–35 | 0.06064 | |
| 50–36 | —0.10567 | |
| | Combinor **60–42** | |
| 50–1 | 0.01000 | 2.0524 |
| 50–2 | —0.00073 | |
| 50–3 | 0.05917 | |
| 50–4 | —0.02545 | |
| 50–5 | —0.00631 | |
| 50–6 | 0.00382 | |
| 50–7 | 0.00758 | |
| 50–8 | 0.00593 | |
| 50–9 | 0.00290 | |
| 50–10 | 0.00030 | |
| 50–11 | 0.01327 | |
| 50–12 | 0.02768 | |
| 50–13 | —0.03069 | |
| 50–14 | 0.02803 | |
| 50–15 | 0.04032 | |
| 50–16 | —0.03132 | |
| 50–17 | 0.04994 | |
| 50–18 | 0.03439 | |
| 50–19 | 0.01399 | |
| 50–20 | 0.09511 | |
| 50–21 | 0.22919 | |
| 50–22 | —0.30116 | |
| 50–23 | 0.00582 | |
| 50–24 | —0.05754 | |
| 50–25 | —0.01272 | |
| 50–26 | —0.02395 | |
| 50–27 | —0.01081 | |
| 50–28 | —0.01319 | |
| 50–29 | —0.00935 | |
| 50–30 | —0.01050 | |
| 50–31 | —0.00429 | |
| 50–32 | —0.01441 | |
| 50–33 | 0.01193 | |
| 50–34 | —0.03942 | |
| 50–35 | 0.06380 | |
| 50–36 | —0.11133 | |
| | Combinor **60–43** | |
| 50–1 | 0.00957 | 2.1227 |
| 50–2 | —0.00075 | |
| 50–3 | 0.05654 | |
| 50–4 | —0.02439 | |
| 50–5 | —0.00608 | |

TABLE II—Continued

| Logarithm generator | y | K |
|---|---|---|
| 50–6 | 0.00361 | |
| 50–7 | 0.00719 | |
| 50–8 | 0.00563 | |
| 50–9 | 0.00275 | |
| 50–10 | 0.00026 | |
| 50–11 | 0.01233 | |
| 50–12 | 0.02656 | |
| 50–13 | —0.02957 | |
| 50–14 | 0.02666 | |
| 50–15 | 0.03731 | |
| 50–16 | —0.03017 | |
| 50–17 | 0.04797 | |
| 50–18 | 0.02368 | |
| 50–19 | 0.03237 | |
| 50–20 | 0.00748 | |
| 50–21 | 0.25684 | |
| 50–22 | —0.06821 | |
| 50–23 | —0.17990 | |
| 50–24 | —0.01666 | |
| 50–25 | —0.03365 | |
| 50–26 | —0.01840 | |
| 50–27 | —0.01587 | |
| 50–28 | —0.01236 | |
| 50–29 | —0.01111 | |
| 50–30 | —0.01078 | |
| 50–31 | —0.00493 | |
| 50–32 | —0.01506 | |
| 50–33 | 0.01234 | |
| 50–34 | —0.04130 | |
| 50–35 | 0.06674 | |
| 50–36 | —0.11663 | |
| | Combinor **60–44** | |
| 50–1 | 0.00916 | 2.1654 |
| 50–2 | —0.00075 | |
| 50–3 | 0.05408 | |
| 50–4 | —0.02338 | |
| 50–5 | —0.00585 | |
| 50–6 | 0.00342 | |
| 50–7 | 0.00685 | |
| 50–8 | 0.00536 | |
| 50–9 | 0.00261 | |
| 50–10 | 0.00023 | |
| 50–11 | 0.01155 | |
| 50–12 | 0.02545 | |
| 50–13 | —0.02844 | |
| 50–14 | 0.02530 | |
| 50–15 | 0.03501 | |
| 50–16 | —0.02872 | |
| 50–17 | 0.04384 | |
| 50–18 | 0.02356 | |
| 50–19 | 0.01744 | |
| 50–20 | 0.03597 | |
| 50–21 | 0.07737 | |
| 50–22 | 0.25998 | |
| 50–23 | —0.30825 | |
| 50–24 | —0.02263 | |
| 50–25 | —0.03898 | |
| 50–26 | —0.02102 | |
| 50–27 | —0.01780 | |
| 50–28 | —0.01338 | |
| 50–29 | —0.01225 | |
| 50–30 | —0.01147 | |
| 50–31 | —0.00547 | |
| 50–32 | —0.01587 | |
| 50–33 | 0.01280 | |
| 50–34 | —0.04333 | |
| 50–35 | 0.06986 | |
| 50–36 | —0.12225 | |

TABLE II—Continued

Combinor 60–45

| Logarithm generator | y | K |
|---|---|---|
| 50–1 | 0.00873 | 2.2530 |
| 50–2 | —0.00076 | |
| 50–3 | 0.05146 | |
| 50–4 | —0.02231 | |
| 50–5 | —0.00560 | |
| 50–6 | 0.00322 | |
| 50–7 | 0.00648 | |
| 50–8 | 0.00507 | |
| 50–9 | 0.00246 | |
| 50–10 | 0.00020 | |
| 50–11 | 0.01070 | |
| 50–12 | 0.02435 | |
| 50–13 | —0.02730 | |
| 50–14 | 0.02393 | |
| 50–15 | 0.03264 | |
| 50–16 | —0.02717 | |
| 50–17 | 0.03999 | |
| 50–18 | 0.02288 | |
| 50–19 | 0.00713 | |
| 50–20 | 0.05249 | |
| 50–21 | —0.00802 | |
| 50–22 | 0.27228 | |
| 50–23 | —0.07518 | |
| 50–24 | —0.19372 | |
| 50–25 | 0.01165 | |
| 50–26 | —0.05089 | |
| 50–27 | —0.00877 | |
| 50–28 | —0.02041 | |
| 50–29 | —0.01129 | |
| 50–30 | —0.01347 | |
| 50–31 | —0.00568 | |
| 50–32 | —0.01714 | |
| 50–33 | 0.01346 | |
| 50–34 | —0.04591 | |
| 50–35 | 0.07372 | |
| 50–36 | —0.12921 | |

Combinor 60–46

| Logarithm generator | y | K |
|---|---|---|
| 50–1 | 0.00829 | 2.3728 |
| 50–2 | —0.00077 | |
| 50–3 | 0.04882 | |
| 50–4 | —0.02123 | |
| 50–5 | —0.00536 | |
| 50–6 | 0.00302 | |
| 50–7 | 0.00611 | |
| 50–8 | 0.00478 | |
| 50–9 | 0.00232 | |
| 50–10 | 0.00018 | |
| 50–11 | 0.00986 | |
| 50–12 | 0.02324 | |
| 50–13 | —0.02613 | |
| 50–14 | 0.02260 | |
| 50–15 | 0.03024 | |
| 50–16 | —0.02573 | |
| 50–17 | 0.03724 | |
| 50–18 | 0.01917 | |
| 50–19 | 0.00944 | |
| 50–20 | 0.03069 | |
| 50–21 | 0.03792 | |
| 50–22 | 0.05107 | |
| 50–23 | 0.29212 | |
| 50–24 | —0.33517 | |
| 50–25 | 0.02002 | |
| 50–26 | —0.06442 | |
| 50–27 | —0.00876 | |
| 50–28 | —0.02392 | |
| 50–29 | —0.01238 | |

TABLE II—Continued

| Logarithm generator | y | K |
|---|---|---|
| 50–30 | —0.01491 | |
| 50–31 | —0.00636 | |
| 50–32 | —0.01838 | |
| 50–33 | 0.01409 | |
| 50–34 | —0.04874 | |
| 50–35 | 0.07799 | |
| 50–36 | —0.13696 | |

Combinor 60–47

| Logarithm generator | y | K |
|---|---|---|
| 50–1 | 0.00797 | 2.4545 |
| 50–2 | —0.00079 | |
| 50–3 | 0.04686 | |
| 50–4 | —0.02045 | |
| 50–5 | —0.00518 | |
| 50–6 | 0.00286 | |
| 50–7 | 0.00584 | |
| 50–8 | 0.00457 | |
| 50–9 | 0.00221 | |
| 50–10 | 0.00016 | |
| 50–11 | 0.00919 | |
| 50–12 | 0.02250 | |
| 50–13 | —0.02535 | |
| 50–14 | 0.02164 | |
| 50–15 | 0.02849 | |
| 50–16 | —0.02460 | |
| 50–17 | 0.03505 | |
| 50–18 | 0.01732 | |
| 50–19 | 0.00894 | |
| 50–20 | 0.02372 | |
| 50–21 | 0.04470 | |
| 50–22 | 0.00449 | |
| 50–23 | 0.25256 | |
| 50–24 | —0.04513 | |
| 50–25 | —0.21579 | |
| 50–26 | 0.02322 | |
| 50–27 | —0.05723 | |
| 50–28 | —0.00510 | |
| 50–29 | —0.02391 | |
| 50–30 | —0.01202 | |
| 50–31 | —0.00917 | |
| 50–32 | —0.01848 | |
| 50–33 | 0.01413 | |
| 50–34 | —0.05105 | |
| 50–35 | 0.08173 | |
| 50–36 | —0.14392 | |

Combinor 60–48

| Logarithm generator | y | K |
|---|---|---|
| 50–1 | 0.00769 | 2.5263 |
| 50–2 | —0.00081 | |
| 50–3 | 0.04510 | |
| 50–4 | —0.01974 | |
| 50–5 | —0.00503 | |
| 50–6 | 0.00273 | |
| 50–7 | 0.00559 | |
| 50–8 | 0.00438 | |
| 50–9 | 0.00212 | |
| 50–10 | 0.00015 | |
| 50–11 | 0.00858 | |
| 50–12 | 0.02186 | |
| 50–13 | —0.02466 | |
| 50–14 | 0.02079 | |
| 50–15 | 0.02697 | |
| 50–16 | —0.02356 | |
| 50–17 | 0.03299 | |
| 50–18 | 0.01628 | |
| 50–19 | 0.00680 | |
| 50–20 | 0.02402 | |

TABLE II—Continued

| Logarithm generator | y | K |
|---|---|---|
| **50–21** | 0.03068 | |
| **50–22** | 0.02667 | |
| **50–23** | 0.10696 | |
| **50–24** | 0.26626 | |
| **50–25** | —0.38268 | |
| **50–26** | 0.05580 | |
| **50–27** | —0.08095 | |
| **50–28** | 0.00124 | |
| **50–29** | —0.03000 | |
| **50–30** | —0.01162 | |
| **50–31** | —0.01084 | |
| **50–32** | —0.01922 | |
| **50–33** | 0.01444 | |
| **50–34** | —0.05356 | |
| **50–35** | 0.08559 | |
| **50–36** | —0.15102 | |
| | Combinor **60–49** | |
| **50–1** | 0.00742 | 2.6075 |
| **50–2** | —0.00085 | |
| **50–3** | 0.04344 | |
| **50–4** | —0.01909 | |
| **50–5** | —0.00489 | |
| **50–6** | 0.00259 | |
| **50–7** | 0.00535 | |
| **50–8** | 0.00420 | |
| **50–9** | 0.00204 | |
| **50–10** | 0.00014 | |
| **50–11** | 0.00796 | |
| **50–12** | 0.02134 | |
| **50–13** | —0.02408 | |
| **50–14** | 0.02002 | |
| **50–15** | 0.02554 | |
| **50–16** | —0.02254 | |
| **50–17** | 0.03105 | |
| **50–18** | 0.01549 | |
| **50–19** | 0.00470 | |
| **50–20** | 0.02530 | |
| **50–21** | 0.01656 | |
| **50–22** | 0.05374 | |
| **50–23** | 0.00430 | |
| **50–24** | 0.31573 | |
| **50–25** | —0.16218 | |
| **50–26** | —0.16013 | |
| **50–27** | 0.00830 | |
| **50–28** | —0.04762 | |
| **50–29** | —0.01163 | |
| **50–30** | —0.02202 | |
| **50–31** | —0.00751 | |
| **50–32** | —0.02274 | |
| **50–33** | 0.01604 | |
| **50–34** | —0.05707 | |
| **50–35** | 0.09024 | |
| **50–36** | —0.15916 | |
| | Combinor **60–50** | |
| **50–1** | 0.00714 | 2.6904 |
| **50–2** | —0.00087 | |
| **50–3** | 0.04175 | |
| **50–4** | —0.01842 | |
| **50–5** | —0.00474 | |
| **50–6** | 0.00245 | |
| **50–7** | 0.00511 | |
| **50–8** | 0.00402 | |
| **50–9** | 0.00195 | |
| **50–10** | 0.00013 | |
| **50–11** | 0.00736 | |

TABLE II—Continued

| Logarithm generator | y | K |
|---|---|---|
| **50–12** | 0.02076 | |
| **50–13** | —0.02345 | |
| **50–14** | 0.01924 | |
| **50–15** | 0.02412 | |
| **50–16** | —0.02153 | |
| **50–17** | 0.02926 | |
| **50–18** | 0.01437 | |
| **50–19** | 0.00409 | |
| **50–20** | 0.02226 | |
| **50–21** | 0.01786 | |
| **50–22** | 0.03610 | |
| **50–23** | 0.03404 | |
| **50–24** | 0.10624 | |
| **50–25** | 0.25106 | |
| **50–26** | —0.38565 | |
| **50–27** | 0.06906 | |
| **50–28** | —0.08535 | |
| **50–29** | 0.00004 | |
| **50–30** | —0.03046 | |
| **50–31** | —0.00560 | |
| **50–32** | —0.02592 | |
| **50–33** | 0.01740 | |
| **50–34** | —0.06086 | |
| **50–35** | 0.09540 | |
| **50–36** | —0.16836 | |
| | Combinor **60–51** | |
| **50–1** | 0.00691 | 2.7379 |
| **50–2** | —0.00091 | |
| **50–3** | 0.04028 | |
| **50–4** | —0.01786 | |
| **50–5** | —0.00462 | |
| **50–6** | 0.00233 | |
| **50–7** | 0.00490 | |
| **50–8** | 0.00386 | |
| **50–9** | 0.00188 | |
| **50–10** | 0.00012 | |
| **50–11** | 0.00679 | |
| **50–12** | 0.02034 | |
| **50–13** | —0.02297 | |
| **50–14** | 0.01858 | |
| **50–15** | 0.02287 | |
| **50–16** | —0.02062 | |
| **50–17** | 0.02767 | |
| **50–18** | 0.01346 | |
| **50–19** | 0.00353 | |
| **50–20** | 0.01976 | |
| **50–21** | 0.01926 | |
| **50–22** | 0.02114 | |
| **50–23** | 0.06079 | |
| **50–24** | —0.02250 | |
| **50–25** | 0.34963 | |
| **50–26** | —0.18065 | |
| **50–27** | —0.15286 | |
| **50–28** | 0.00798 | |
| **50–29** | —0.05097 | |
| **50–30** | —0.01348 | |
| **50–31** | —0.01678 | |
| **50–32** | —0.02284 | |
| **50–33** | 0.01559 | |
| **50–34** | —0.06310 | |
| **50–35** | 0.09980 | |
| **50–36** | —0.17734 | |
| | Combinor **60–52** | |
| **50–1** | 0.00670 | 2.7801 |
| **50–2** | —0.00094 | |
| **50–3** | 0.03899 | |

| Logarithm generator | y | K |
|---|---|---|
| 50–4 | —0.01736 | |
| 50–5 | —0.00451 | |
| 50–6 | 0.00222 | |
| 50–7 | 0.00472 | |
| 50–8 | 0.00372 | |
| 50–9 | 0.00182 | |
| 50–10 | 0.00012 | |
| 50–11 | 0.00628 | |
| 50–12 | 0.01999 | |
| 50–13 | —0.02258 | |
| 50–14 | 0.01802 | |
| 50–15 | 0.02177 | |
| 50–16 | —0.01981 | |
| 50–17 | 0.02625 | |
| 50–18 | 0.01283 | |
| 50–19 | 0.00264 | |
| 50–20 | 0.01922 | |
| 50–21 | 0.01544 | |
| 50–22 | 0.02479 | |
| 50–23 | 0.03725 | |
| 50–24 | 0.03015 | |
| 50–25 | 0.10971 | |
| 50–26 | 0.26336 | |
| 50–27 | —0.40477 | |
| 50–28 | 0.07977 | |
| 50–29 | —0.09357 | |
| 50–30 | —0.00136 | |
| 50–31 | —0.02604 | |
| 50–32 | —0.02103 | |
| 50–33 | 0.01429 | |
| 50–34 | —0.06582 | |
| 50–35 | 0.10457 | |
| 50–36 | —0.18684 | |
| | Combinor 60–53 | |
| 50–1 | 0.00651 | 2.8802 |
| 50–2 | —0.00099 | |
| 50–3 | 0.03777 | |
| 50–4 | —0.01691 | |
| 50–5 | —0.00443 | |
| 50–6 | 0.00211 | |
| 50–7 | 0.00454 | |
| 50–8 | 0.00359 | |
| 50–9 | 0.00176 | |
| 50–10 | 0.00012 | |
| 50–11 | 0.00573 | |
| 50–12 | 0.01975 | |
| 50–13 | —0.02229 | |
| 50–14 | 0.01751 | |
| 50–15 | 0.02070 | |
| 50–16 | —0.01901 | |
| 50–17 | 0.02486 | |
| 50–18 | 0.01228 | |
| 50–19 | 0.00176 | |
| 50–20 | 0.01880 | |
| 50–21 | 0.01199 | |
| 50–22 | 0.02815 | |
| 50–23 | 0.01725 | |
| 50–24 | 0.07502 | |
| 50–25 | —0.04608 | |
| 50–26 | 0.37656 | |
| 50–27 | —0.19639 | |
| 50–28 | —0.15506 | |
| 50–29 | 0.00376 | |
| 50–30 | —0.04972 | |
| 50–31 | —0.00602 | |
| 50–32 | —0.03433 | |
| 50–33 | 0.02017 | |

| Logarithm generator | y | K |
|---|---|---|
| 50–34 | —0.07283 | |
| 50–35 | 0.11186 | |
| 50–36 | —0.19850 | |
| | Combinor 60–54 | |
| 50–1 | 0.00632 | 3.0133 |
| 50–2 | —0.00104 | |
| 50–3 | 0.03658 | |
| 50–4 | —0.01648 | |
| 50–5 | —0.00434 | |
| 50–6 | 0.00201 | |
| 50–7 | 0.00436 | |
| 50–8 | 0.00346 | |
| 50–9 | 0.00170 | |
| 50–10 | 0.00012 | |
| 50–11 | 0.00519 | |
| 50–12 | 0.01952 | |
| 50–13 | —0.02201 | |
| 50–14 | 0.01701 | |
| 50–15 | 0.01966 | |
| 50–16 | —0.01823 | |
| 50–17 | 0.02353 | |
| 50–18 | 0.01169 | |
| 50–19 | 0.00117 | |
| 50–20 | 0.01765 | |
| 50–21 | 0.01133 | |
| 50–22 | 0.02356 | |
| 50–23 | 0.02201 | |
| 50–24 | 0.03942 | |
| 50–25 | 0.02893 | |
| 50–26 | 0.09765 | |
| 50–27 | 0.29439 | |
| 50–28 | —0.43152 | |
| 50–29 | 0.08233 | |
| 50–30 | —0.09242 | |
| 50–31 | 0.00948 | |
| 50–32 | —0.04630 | |
| 50–33 | 0.02509 | |
| 50–34 | —0.07998 | |
| 50–35 | 0.11966 | |
| 50–36 | —0.21152 | |
| | Combinor 60–55 | |
| 50–1 | 0.00618 | 3.0865 |
| 50–2 | —0.00109 | |
| 50–3 | 0.03563 | |
| 50–4 | —0.01614 | |
| 50–5 | —0.00428 | |
| 50–6 | 0.00191 | |
| 50–7 | 0.00421 | |
| 50–8 | 0.00335 | |
| 50–9 | 0.00166 | |
| 50–10 | 0.00012 | |
| 50–11 | 0.00470 | |
| 50–12 | 0.01941 | |
| 50–13 | —0.02186 | |
| 50–14 | 0.01664 | |
| 50–15 | 0.01878 | |
| 50–16 | —0.01757 | |
| 50–17 | 0.02241 | |
| 50–18 | 0.01125 | |
| 50–19 | 0.00062 | |
| 50–20 | 0.01683 | |
| 50–21 | 0.01060 | |
| 50–22 | 0.02050 | |
| 50–23 | 0.02450 | |
| 50–24 | 0.01651 | |

TABLE II—Continued

| Logarithm generator | y | K |
|---|---|---|
| 50-25 | 0.07543 | |
| 50-26 | −0.04480 | |
| 50-27 | 0.36461 | |
| 50-28 | −0.15558 | |
| 50-29 | −0.18270 | |
| 50-30 | 0.00483 | |
| 50-31 | −0.04747 | |
| 50-32 | −0.02344 | |
| 50-33 | 0.01256 | |
| 50-34 | −0.07844 | |
| 50-35 | 0.12319 | |
| 50-36 | −0.22307 | |

Each of the fifty-five linear combinor circuits is designed to produce an output voltage proportional to the number of formants located below a specified frequency. These frequencies are set forth in Table III.

TABLE III

| Combinor: | Frequency c.p.s. |
|---|---|
| 60-1 | 75.0 |
| 60-2 | 112.5 |
| 60-3 | 137.5 |
| 60-4 | 162.5 |
| 60-5 | 187.5 |
| 60-6 | 212.5 |
| 60-7 | 237.5 |
| 60-8 | 262.5 |
| 60-9 | 287.5 |
| 60-10 | 312.5 |
| 60-11 | 337.5 |
| 60-12 | 362.5 |
| 60-13 | 387.5 |
| 60-14 | 412.5 |
| 60-15 | 437.5 |
| 60-16 | 462.5 |
| 60-17 | 487.5 |
| 60-18 | 512.5 |
| 60-19 | 537.5 |
| 60-20 | 562.5 |
| 60-21 | 587.5 |
| 60-22 | 616.5 |
| 60-23 | 650.5 |
| 60-24 | 688.0 |
| 60-25 | 729.0 |
| 60-26 | 772.5 |
| 60-27 | 818.5 |
| 60-28 | 867.0 |
| 60-29 | 918.5 |
| 60-30 | 972.5 |
| 60-31 | 1030.0 |
| 60-32 | 1090.0 |
| 60-33 | 1150.0 |
| 60-34 | 1225.0 |
| 60-35 | 1300.0 |
| 60-36 | 1380.0 |
| 60-37 | 1460.0 |
| 60-38 | 1545.0 |
| 60-39 | 1635.0 |
| 60-40 | 1730.0 |
| 60-41 | 1835.0 |
| 60-42 | 1945.0 |
| 60-43 | 2060.0 |
| 60-44 | 2185.0 |
| 60-45 | 2315.0 |
| 60-46 | 2475.0 |
| 60-47 | 2620.0 |
| 60-48 | 2750.0 |
| 60-49 | 2915.0 |
| 60-50 | 3090.0 |
| 60-51 | 3275.0 |
| 60-52 | 3470.0 |
| 60-53 | 3675.0 |
| 60-54 | 3890.0 |
| 60-55 | 4120.0 |

The values of the elements in each of the linear combinor circuits 60-1 through 60-55 are such that when there are no formants contained in the input signal from source 10, the output level of each of the output leads from the linear combinor circuits is at zero level. When one or more formants are present, the voltage output of the linear combinor circuits increase in steps of +1 volt for each formant. For example, presume there are three formants present at respective frequencies of 500 cycles per second, 1000 cycles per second and 1500 cycles per second. From Table III it is seen that the lowest frequency formant occurs above the frequency associated with linear combinor circuit 60-17, and below the frequency associated with linear combinor circuit 60-18. The next formant is present above the frequency associated with linear combinor circuit 60-30 and below the frequency associated with linear combinor circuit 60-31, and the last formant occurs in the range between the frequencies associated with linear combinor circuits 60-37 and 60-38. The output voltages of linear combinor circuits 60-1 through 60-17 would be zero. The output voltages of linear combinor circuits 60-18 through 60-30 are one volt, the output voltages of linear combinor circuits 60-31 through 60-37 are two volts and the output voltages of the linear combinor circuits 60-38 through 60-55 are three volts. If the actual output voltage of the linear combinor circuits 60-1 through 60-55 are plotted against their total frequency range, a curve as shown in FIG. 7 is produced. It can be seen from the curve of FIG. 7 that one formant is present between 487.5 and 512.5 cycles per second, a second formant is present between 972.5 and 1030.5 cycles per second, and a third formant is present between 1460 and 1545 cycles per second. As previously stated, if more than one formant is present in a given range defined by the linear combinor circuits, a step of two volts would result. For example, if there were formants at 1480 cycles per second and 1520 cycles per second, the third step would go from two volts to four volts.

It is accepted in the speech recognition art that the first three formants are sufficient in the analysis of voiced sounds. The first formant is the lowest frequency formant and the second and third formants have respectively higher frequencies. Thus, in FIG. 7, the step from zero to one volt represents the first formant, the step from one volt to two volts represents the second formant and the step from two volts to three volts represents the third formant.

In order to physically provide the information observable in the curve of FIG. 7, the outputs of the linear combinor circuits 60-1 through 60-55 are applied to a plurality of comparator circuits. The output of linear combinor circuit 60-1 is applied to a first comparator 81-1, a second comparator 82-1 and a third comparator 83-1. The output of linear combinor circuit 60-2 is connected to a first comparator 81-2, a second comparator 82-2 and a third comparator 82-3, and so on to the output of linear comparator circuit 60-55 which is connected to a first comparator 81-55, a second comparator 82-55 and a third comparator 83-55. Each of the first comparators 81-1 through 81-55 have a second input connected to a source of +0.5 voltage 84; each of the second comparators 82-1 through 82-55 have a second input connected to a source of +1.5 voltage 85; and each of the third comparators have a second input connected to a source of +2.5 voltage 86.

The output of comparator 81-1 is connected to the input of an inverter circuit 91-1, the output of comparator 82–1 is connected to the input of an inverter circuit 92–1, and the output of comparator 83–1 is connected to the input of an inverter circuit 93–1. Likewise, the outputs of comparators 81–2, 82–2, and 83–2 are respectively connected to the inputs of inverter circuits 91–3, 92–2 and 93–2; the outputs of comparators 81–3, 82–3, and 83–3 are respectively connected to the inputs of inverter circuits 91–3, 92–3 and 93–3, and so on with the exception of comparators 81–55, 82–55 and 83–55.

The outputs of inverter circuits 91–1, 92–1 and 93–1 are respectively connected to one of the inputs of "AND" circuits 101–1, 102–1, and 103–1, the outputs of inverter circuits 91–2, 92–2 and 93–2 are respectively connected to one of the inputs of "AND" circuits 101–2, 102–2, and 103–2, and so on until inverter circuits 91–54, 92–54, and 93–54 which are connected to one input of "AND" circuits 101–54, 102–54 and 103–54. The outputs of "AND" circuits 101–1, 101–2, 101–3 . . . , 101–54 are respectively connected to indicator circuits 111–1, 111–2, 111–3 . . . , 111–54. The outputs of "AND" circuits 102–1, 102–2, 102–3 . . . , 102–54 are connected to indicator circuits 112–1, 112–2, 112–3 . . . , 112–54 and the outputs of "AND" circuits 103–1, 103–2, 103–3 . . . , 103–54 are connected to indicator circuits 113–1, 113–2, 113–3 . . . , 113–54.

The other inputs of "AND" circuits 101–1, 102–1 and 103–1 are respectively connected to the outputs of comparators 81–2, 82–2 and 82–3. Likewise, the other inputs of "AND" circuits 101–2, 102–2 and 103–2 are connected to the outputs of comparators 81–3, 82–3 and 83–3 and so on until "AND" circuits 101–54, 102–54 and 103–54 which have their other inputs respectively connected to the outputs of comparators 81–55, 82–55 and 83–55. Thus, each comparator (with the exceptions of 81–55, 82–55 and 83–55) have their outputs inverted and "ANDed" with the output of an associated comparator coupled to the next higher frequency range linear combinor circuit.

The comparators 81–1, 82–1, 83–1 81–2, 82–2, 83–2, 81–3, 82–3, 83–3, etc. are actually threshold circuits and may be embodied by operational amplifiers. Comparators 81–1, 81–2, 81–3 . . . , 81–55 provide a negative output for linear combinor circuit output signals below +0.5 volt and positive output signals for linear combinor signals above +0.5 volt. Likewise, comparators 82–1, 82–2, 82–3 . . . , 82–55 provide positive signals for input voltages from the linear combinor circuits above +1.5 volts and negative output voltages for those below +1.5 volts and comparators 83–1, 83–2, 83–3 . . . , 83–55 provide positive output voltages in response to input voltages from the linear combinor circuits above +2.5 volts and negative output voltages for those below +2.5 volts. The relationship of the voltages of sources 84, 85, and 86 with respect to the step voltage levels are shown by the dotted lines in FIG. 7.

The output signals from each of the comparators are inverted and logically gated with the uninverted output of the adjacent comparator of the higher frequency channel. Thus, if the first formant of the speech signal were located between 112.5 and 137.5 cycles per second, a zero output signal would be produced by linear combinor circuit 60–2 and a +1.0 output signal would be produced by linear combinor circuit 60–3. The output signal from comparators 81–1 and 81–2 will be negative and the output signal from comparators 81–3 and above will be positive. Only "AND" circuit 101–2 will be gated and only indicator circuit 111–2 will be actuated. Indicator circuits 111–1 through 111–54 are first formant indicator devices and may be lamps, printers, counters, etc. Indicator circuit 111–2, when actuated, indicates that the output signal from linear combinor circuit 60–2 is below +0.5 volt and the signal from linear combinor circuit 60–3 is above +0.5 volt. This in turn indicates that the first formant frequency is between 112.5 and 137.5 cycles per second. Likewise, actuation of indicator 111–1 indicates that the first formant is between 75 and 112.5 cycles per second, indicator 111–3 indicates that the first formant is between 137.5 and 162.5 cycles per second, etc. The range of indication of and of the indicators 111–1 through 111–54 may be determined by referring to Table III, for example, indicator 111–39 would indicate a first formant having a frequency between 1635 and 1730 cycles per second.

The same is true for the remainder of the circuit which provides indications of the second and third formants. If linear combinor circuit 60–3 were to provide a +2.0 output signal indicative of a second format, comparator 82–3 will produce a positive output signal when compared with the +1.5 voltage. The output of comparator 82–2 will be negative, so that when inverted by inverter circuit 92–2 it will gate "AND" circuit 102–2 and actuate indicator circuit 112–2, thereby indicating that the second formant is in the 112.5 to 137.5 cycles per second range. Likewise, indicator circuits 113–1 through 113–54 provide an indication of the location of the third formants since comparators 83–1 through 83–55 are biased at +2.5 volts and will only respond to a third formant or +3.0 input signal from the linear combinor circuits.

What has been described is a speech recognition system which performs measurements on a speech signal, the value of the measurements being linear functions of the contributions of the individual formants present in the speech signal.

The measurements are linearly combined according to a weighted average and the location of the formants on the speech signal are deduced from the combination.

In the present embodiment shown in the drawings the measurements were the slope of the logarithms of the power vs. the log of the frequency of the speech signal since such is a linear function of the contribution of the individual formants. Another measurement which might have been used instead is the number of zero crossings present in the speech signal after filtering by the narrow band filters.

It is to be understood that the embodiment shown in FIGS. 5A through 5D represents one way to carry out the present invention. The choice of thirty-six filters and fifty-five linear combinor circuits is one of design and other variations are possible.

It is also to be understood that the present invention is not restricted to formant location. Formants were employed in the present example because they are examples of resonant frequencies produced by the vocal cavity. The teachings of the present invention can be employed for determining the resonant frequencies of other resonant systems such as electrical circuits and mechanical devices.

While the invention has been particularly shown and described with reference to a preferred embodiment thereof, it will be understood by those skilled in the art that various changes in form and details may be made therein without departing from the spirit and scope of the invention.

What is claimed is:

1. A system for determining the frequency of at least one resonant peak amplitude within a frequency spectrum comprising:
   a source of signal having at least one resonant peak amplitude at a given frequency,
   first means responsive to said signal for performing measurements thereon, said measurements being linear functions of the contributions of said at least one resonant peak amplitude, second means responsive to said first means for linearly combining said measurements according to a weighted average,
   and indicator means responsive to said linearly combined measurements for indicating the frequency of said at least one resonant peak.

2. A system for determining the frequencies of a plurality of resonant peak amplitudes within a frequency spectrum comprising:

a source of signal having a plurality of resonant peak amplitudes at given frequencies, first means responsive to said signal for performing measurements thereon, said measurements being linear functions of the contributions of said resonant peak amplitudes, second means responsive to said first means for linearly combining said measurements according to a weighted average, and indicator means responsive to said linearly combined measurements for indicating the given frequencies of said plurality of resonant peak amplitudes.

3. A system for determining the frequencies of a plurality of resonant peak amplitudes within a frequency spectrum comprising:

a source of varying signal having a plurality of resonant peak amplitudes at given frequencies, means responsive to said source of varying signal for producing an output signal representative of the power spectrum of said varying signal, means responsive to said power spectrum signal for providing an output signal representative of the logarithm of said power spectrum signal, means responsive to said logarithm of said power spectrum signal for producing a plurality of output signals representative of the slopes of said logarithms of said power spectrum signal at a plurality of separate frequencies within said frequency spectrum, and means for combining said plurality of output signals representative of the slopes of said logarithms of said power spectrum for producing an output signal having distinctive amplitude discontinuities at frequencies associated with the location of said resonant peak amplitudes within said varying signal.

4. A system according to claim 3 further including indicator means responsive to said signal having said distinctive amplitude discontinuities for indicating the frequences at which said amplitude discontinuities are located.

5. A system for determining the frequency locations of the formants within a speech signal comprising:

a source of speech signal waveform having a plurality of formants within the frequency spectrum thereof, means responsive to said speech signal for producing an output signal representative of the power spectrum of said speech signal, means responsive to said power spectrum signal for producing an output signal representative of the logarithm of said power spectrum signal, means responsive to said signal representative of the logarithm of said power spectrum signal for providing a plurality of signals representative of the slope of said logarithm signal at separate frequencies within said frequency spectrum, and means for combining said plurality of slope representative signals for producing an output signal having a distinctive amplitude change at each frequency at which one of said plurality of formants is located.

6. A system for determining the frequency locations of the formants within a speech signal comprising:

a source of an electrical analog signal of a speech waveform, a plurality of band pass filters coupled to said source of electrical analog signal for passing components of said signal within associated separate adjacent frequency ranges, a separate means connected to the output of each of said band pass filters for producing an output signal representative of the power of the output signal from said band pass filters, a separate logarithm function generator connected to the output of each of said power signal producing means for providing an output signal representative of the logarithm of the input power signal thereto, and means for combining the logarithm output signals from said logarithm function generators for providing an output signal having a distinctive amplitude change at frequencies representative of the location of the formants in said speech signal.

7. A system according to claim 6 further including amplitude sensitive means responsive to said distinctive amplitude changes of said output signals from said combining means for indicating the frequencies at which said distinctive amplitude changes occur.

8. A system according to claim 6 wherein said combining means includes a plurality of linear combinor circuits, each linear combinor circuit being responsive to the output signal from all of the said logarithm function generators, each of said linear combinor circuits including a plurality of resistor elements for modifying said logarithm function generator signals according to given weighted values.

9. A system according to claim 8 wherein each of said linear combinor circuits is associated with a separate frequency band within a given frequency range, the frequency bands of adjacent linear combinor circuits being juxtaposed, and wherein the output signal from each of said linear combinor circuits manifests a distinctive amplitude level for each formant located at a frequency lower than the frequency associated with said linear combinor circuit.

10. A system according to claim 9 wherein said amplitude sensitive means includes an indicator means for combining the output signals from said linear combinor circuits to form a composite signal having distinctive amplitude.

References Cited

UNITED STATES PATENTS

| | | |
|---|---|---|
| 2,851,661 | 9/1958 | Bulano. |
| 2,938,079 | 5/1960 | Flanagan. |

KATHLEEN H. CLAFFY, *Primary Examiner.*

R. MURRAY, R. P. TAYLOR, *Assistant Examiners.*